(12) United States Patent
Ueno et al.

(10) Patent No.: US 11,298,896 B2
(45) Date of Patent: Apr. 12, 2022

(54) MOLDING DEVICE AND MOLDED ARTICLE MANUFACTURING METHOD

(71) Applicant: TOYOTA JIDOSHA KABUSHIKI KAISHA, Toyota (JP)

(72) Inventors: Yasuhiro Ueno, Miyoshi (JP); Shotaro Ishikawa, Yokohama (JP); Masataka Asai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 16/382,598

(22) Filed: Apr. 12, 2019

(65) Prior Publication Data

US 2019/0366654 A1 Dec. 5, 2019

(30) Foreign Application Priority Data

Jun. 4, 2018 (JP) .............................. JP2018-106897

(51) Int. Cl.
*B29C 70/54* (2006.01)
*B29C 70/16* (2006.01)
*B29C 70/48* (2006.01)

(52) U.S. Cl.
CPC ............ *B29C 70/543* (2013.01); *B29C 70/16* (2013.01); *B29C 70/48* (2013.01)

(58) Field of Classification Search
CPC ........ B29C 70/543; B29C 70/46; B29C 70/48
See application file for complete search history.

(56) References Cited

U.S. PATENT DOCUMENTS

| 5,618,567 A | 4/1997 | Hara et al. |
| 6,673,296 B2 * | 1/2004 | Hiraiwa ............... B29C 44/141 |
| | | 264/275 |
| 2001/0000584 A1 | 5/2001 | Spengler |
| 2001/0045684 A1 | 11/2001 | Blanchon |
| 2003/0133950 A1 | 7/2003 | Michael et al. |
| 2009/0072441 A1 * | 3/2009 | Bracke ................ B31D 3/0284 |
| | | 264/271.1 |
| 2011/0204541 A1 | 8/2011 | Graham |

(Continued)

FOREIGN PATENT DOCUMENTS

| DE | 3338513 A1 | 5/1985 |
| JP | 54152063 A | 11/1979 |

(Continued)

OTHER PUBLICATIONS

Communication dated Nov. 26, 2019 from the European Patent Office in application No. 19168454.7.

(Continued)

*Primary Examiner* — Galen H Hauth
(74) *Attorney, Agent, or Firm* — Sughrue Mion, PLLC

(57) ABSTRACT

A pressing member is configured to press a portion-to-be-pressed of a continuous-fiber sheet against a recessed surface of a first mold in a state where the continuous-fiber sheet is placed between the first mold and a second mold. A pulling member is configured to bring the continuous-fiber sheet into close contact with the main surface and the recessed surface by pulling a portion of the continuous-fiber sheet located on an outer peripheral side of the portion-to-be-pressed after the pressing member presses the portion-to-be-pressed against the recessed surface.

8 Claims, 22 Drawing Sheets

(56) References Cited

U.S. PATENT DOCUMENTS

2013/0101694 A1  4/2013  Theinert et al.
2015/0328843 A1  11/2015  Karb et al.

FOREIGN PATENT DOCUMENTS

| | | |
|---|---|---|
| JP | 62-38133 U | 3/1987 |
| JP | 63132026 A | 6/1988 |
| JP | 5-115221 A | 5/1993 |
| JP | 5-269832 A | 10/1993 |
| JP | 6-15671 A | 1/1994 |
| JP | 7-195429 A | 8/1995 |
| JP | 2013-203068 A | 10/2013 |
| JP | 2014-148124 A | 8/2014 |
| JP | 2016-502944 A | 2/2016 |
| JP | 2017-213819 A | 12/2017 |
| WO | 2007101868 A2 | 9/2007 |

OTHER PUBLICATIONS

Partial Translation of the Office Action dated Dec. 7, 2021 in from the Japanese Patent Office in Application No. 2018-106897.

\* cited by examiner

MOLDING DEVICE AND MOLDED ARTICLE MANUFACTURING METHOD

INCORPORATION BY REFERENCE

The disclosure of Japanese Patent Application No. 2018-106897 filed on Jun. 4, 2018 including the specification, drawings and abstract is incorporated herein by reference in its entirety.

BACKGROUND

1. Technical Field

The present disclosure relates to a molding device and a molded article manufacturing method.

2. Description of Related Art

Various proposals have been hitherto made of a molding device that molds a resin product containing a continuous-fiber sheet.

For example, Japanese Patent Application Publication No. 2014-148124 (JP 2014-148124 A) describes a molded article and a molding device for molding a molded article.

This molded article includes a press-molded part and an injection-molded part. The press-molded part has a comparatively simple shape including a flat plate portion and a peripheral wall, which form the shape of a cover. The press-molded part is made of resin and continuous fibers contained in the resin.

The injection-molded part is formed integrally with the press-molded part. The injection-molded part includes a connection wall that is connected to the peripheral wall and a grid-like rib that is formed on an inner surface of the flat plate portion of the press-molded part. This injection-molded part is made of resin and short fibers contained in the resin.

The molding device described in JP 2014-148124 A is a device for manufacturing the above-described molded article. This molding device includes an upper mold and a lower mold, and the lower mold has an upper surface that is a substantially flat surface and a peripheral surface that extends downward from an outer peripheral edge portion of this upper surface. The upper mold has a ceiling surface corresponding to the upper surface of the lower mold and an inner peripheral surface corresponding to the peripheral surface of the lower mold.

As the upper mold and the lower mold come into contact with each other, a cavity is formed between the upper mold and the lower mold. The cavity represents the shape of the molded article.

To produce a molded article by using this molding device, first, a plate-shaped base material containing a continuous-fiber sheet is placed on the upper mold. Then, the molding device sandwiches the base material between the upper mold and the lower mold, and thereby bends the base material and molds the press-molded part.

The molding device supplies resin containing short fibers into the cavity, and integrally couples the injection-molded part to the press-molded part inside the cavity. Thus, the molded article is formed inside the cavity.

SUMMARY

In the molded article described in JP 2014-148124 A, the press-molded part containing a continuous-fiber sheet has a simple shape, and for example, the flat plate portion does not have a stepped portion or a recessed or raised portion.

If a stepped portion or a recessed or raised portion is to be formed in the flat plate portion containing the continuous-fiber sheet, the shape of the cavity of the molding device needs to be adapted to the stepped portion or the recessed or raised portion of the flat plate portion. Forming a cavity of a shape having a recessed or raised portion requires, for example, forming a recessed portion in the lower mold and a raised portion in the upper mold.

To produce a molded article by using this molding device, first, a base material containing a continuous-fiber sheet is placed on the upper surface of the lower mold. Then, the upper mold is brought closer to the lower mold to mold the base material.

In some cases, a portion of the continuous-fiber sheet becomes lifted up as a result of the raised portion of the upper mold pressing the continuous-fiber sheet against a bottom surface of the recessed portion of the lower mold. If resin etc. is supplied into the cavity thereafter, the molded article may be manufactured with wrinkles etc. formed in the continuous-fiber sheet. The same problem occurs with a mold of which the cavity has a shape including a stepped portion.

The present disclosure provides a molding device and a manufacturing method that can form a molded article containing a continuous-fiber sheet in which a stepped portion or a recessed or raised portion is formed and that can reduce the formation of wrinkles etc. in the continuous-fiber sheet.

A molding device according to a first aspect of the present disclosure includes a first mold and a second mold. The molding device is configurerd to shape a continuous-fiber sheet placed between the first mold and the second mold. The first mold and the second mold are placed so as to face each other. At least one of the first mold and the second mold is configured to be movable in a separating direction in which the first mold and the second mold are separated relatively farther away from each other and in an approaching direction in which the first mold and the second mold are brought relatively closer to each other. The first mold includes a placing surface on which the continuous-fiber sheet placed between the first mold and the second mold is placed. The placing surface includes a main surface and at least one recessed surface that is connected to the main surface and located farther away from the second mold than the main surface is. The second mold has at least one pressing member configured to press the continuous-fiber sheet placed on the placing surface against the recessed surface, and a pulling member configured to pull the continuous-fiber sheet. The pressing member is configured to press a portion-to-be-pressed of the continuous-fiber sheet against the recessed surface in a state where the continuous-fiber sheet is placed between the first mold and the second mold. The pulling member is configured to bring the continuous-fiber sheet into close contact with the main surface by pulling a portion of the continuous-fiber sheet located on an outer peripheral side of the portion-to-be-pressed after the pressing member presses the portion-to-be-pressed against the recessed surface.

Even when a portion of the continuous-fiber sheet becomes lifted up as a result of the pressing member pressing the portion-to-be-pressed of the continuous-fiber sheet against the recessed surface, this molding device can smooth out the lifted portion of the continuous-fiber sheet as the pulling member pulls a portion of the continuous-fiber sheet located on the outer peripheral side of the portion-to-be-pressed.

As a result, the continuous-fiber sheet comes into close contact with the recessed surface and the main surface. Thus, it is possible to form a stepped portion or a recessed or raised portion in the continuous-fiber sheet, and to reduce the formation of wrinkles etc. in the continuous-fiber sheet of the molded article.

In the molding device of the first aspect, the continuous-fiber sheet placed on the placing surface may include an outer peripheral portion that projects outward from an outer peripheral edge portion of the placing surface. The pulling member may be configured to bring the continuous-fiber sheet into close contact with the main surface by pulling the outer peripheral portion.

This molding device can smooth out a lifted portion of the continuous-fiber sheet by pulling the outer peripheral portion of the continuous-fiber sheet, and can thereby reduce the formation of wrinkles etc. in the continuous-fiber sheet of the molded article.

In the molding device of the first aspect, the first mold may include a peripheral surface that is connected to the outer peripheral edge portion of the placing surface and extends in a direction away from the second mold. The pulling member may be configured to bring the continuous-fiber sheet into close contact with the main surface by moving the outer peripheral portion in the approaching direction and shaping the outer peripheral portion so as to fit the peripheral surface. The molding device may further include a third mold that presses against the peripheral surface an outer edge of the outer peripheral portion that has been shaped by the pulling member so as to fit the peripheral surface.

This molding device presses the outer edge of the outer peripheral portion against the peripheral surface by the third mold, and can thereby restrain the continuous-fiber sheet from rolling up over the peripheral surface. Thus, a molded article can be formed with the outer peripheral portion of the continuous-fiber sheet conforming to the shape of the peripheral surface of the first mold.

The molding device of the first aspect may be configured such that a cavity to house the continuous-fiber sheet is formed as the first mold, the second mold, and the third mold are moved closer to one another. The molding device may further include a supply device configured to supply resin into the cavity.

This molding device can impregnate the continuous-fiber sheet with resin in a state where the continuous-fiber sheet is in close contact with the main surface and the peripheral surface, and can reduce the formation of wrinkles etc. in the continuous-fiber sheet of the molded article.

In the molding device of the first aspect, the placing surface may include a first recessed surface and a second recessed surface that is located closer to an outer peripheral edge portion of the placing surface than the first recessed surface is. The second mold may include a first pressing member and a second pressing member. The first pressing member may be configured to press a first portion-to-be-pressed of the continuous-fiber sheet against the first recessed surface, and the second pressing member may be configured to press a second portion-to-be-pressed of the continuous-fiber sheet against the second recessed surface. The second pressing member may be configured to press the second portion-to-be-pressed against the second recessed surface after the first pressing member presses the first portion-to-be-pressed against the first recessed surface. The pulling member may be configured to pull a portion of the continuous-fiber sheet located on an outer peripheral side of the second portion-to-be-pressed after the second pressing member presses the second portion-to-be-pressed against the second recessed surface.

In this molding device, the second pressing member presses the second portion-to-be-pressed against the second recessed surface after the first pressing member presses the first portion-to-be-pressed against the first recessed surface. Thus, even when the continuous-fiber sheet becomes lifted up in the vicinity of the first recessed surface as a result of pressing the first portion-to-be-pressed against the first recessed surface, the lifted portion can be smoothed out as the second pressing member presses the second portion-to-be-pressed. Thereafter, the second pressing member presses the second portion-to-be-pressed against the second recessed surface.

Even when a portion of the continuous-fiber sheet becomes lifted up as a result of the second pressing member pressing the second portion-to-be-pressed against the second recessed surface, the lifted portion can be smoothed out as the pulling member pulls a portion of the continuous-fiber sheet on the outer peripheral side of the second portion-to-be-pressed. Thus, the continuous-fiber sheet can be brought into close contact with the main surface.

A molded article manufacturing method according to a second aspect of the present disclosure includes: preparing a first mold and a second mold placed so as to face each other; placing a continuous-fiber sheet between the first mold and the second mold; and processing the continuous-fiber sheet by the first mold and the second mold. At least one of the first mold and the second mold is configured to be movable in a separating direction in which the first mold and the second mold are separated relatively farther away from each other and in an approaching direction in which the first mold and the second mold are brought relatively closer to each other. The first mold includes a placing surface on which the continuous-fiber sheet placed between the first mold and the second mold is placed. The placing surface includes a main surface and at least one recessed surface that is connected to the main surface and located farther away from the second mold than the main surface is. Processing the continuous-fiber sheet includes pressing a portion-to-be-pressed of the continuous-fiber sheet against the recessed surface, and after pressing the portion-to-be-pressed against the recessed surface, bringing the continuous-fiber sheet into close contact with the main surface by pulling a portion of the continuous-fiber sheet located on an outer peripheral side of the portion-to-be-pressed.

This manufacturing method involves pressing the portion-to-be-pressed of the continuous-fiber sheet against the recessed surface, and then pulling a portion of the continuous-fiber sheet located on the outer peripheral side of the portion-to-be-pressed so as to bring the continuous-fiber sheet into close contact with the main surface. Thus, the formation of wrinkles etc. in the continuous-fiber sheet of the molded article can be reduced. Moreover, a stepped portion or a recessed or raised portion can be formed in the continuous-fiber sheet.

In the manufacturing method of the second aspect, the continuous-fiber sheet placed on the placing surface may include an outer peripheral portion that projects outward from an outer peripheral edge portion of the placing surface, and bringing the continuous-fiber sheet into close contact with the main surface may be bringing the continuous-fiber sheet into close contact with the main surface by pulling the outer peripheral portion.

This manufacturing method involves bringing the continuous-fiber sheet into close contact with the main surface by pulling the outer peripheral portion of the continuous-fiber sheet, and thus can reduce the formation of wrinkles etc. in the continuous-fiber sheet of the molded article.

In the manufacturing method of the second aspect, the first mold may include a peripheral surface that is connected to the outer peripheral edge portion of the placing surface and extends in a direction away from the second mold. Bringing the continuous-fiber sheet into close contact with the main surface may include bringing the continuous-fiber sheet into close contact with the main surface by moving the outer peripheral portion in the approaching direction and shaping the outer peripheral portion so as to fit the peripheral surface. This manufacturing method may further include pressing an outer edge of the outer peripheral portion that has been shaped so as to fit the peripheral surface, against the peripheral surface by a third mold.

This manufacturing method can bring the outer peripheral portion of the continuous-fiber sheet into close contact with the peripheral surface of the first mold, and can restrain the outer peripheral portion of the continuous-fiber sheet from rolling up over the peripheral surface of the first mold.

In the manufacturing method of the second aspect, a cavity to house the continuous-fiber sheet may be formed by moving the first mold, the second mold, and the third mold closer to one another. This manufacturing method may further include supplying resin into the cavity.

This manufacturing method can impregnate the continuous-fiber sheet with resin in a state where the continuous-fiber sheet is in close contact with the recessed surface and the main surface.

In the manufacturing method of the second aspect, the placing surface may include a first recessed surface and a second recessed surface that is located closer to an outer peripheral edge portion of the placing surface than the first recessed surface is. Pressing the portion-to-be-pressed against the recessed surface may include pressing a first portion-to-be-pressed of the continuous-fiber sheet against the first recessed surface, and pressing a second portion-to-be-pressed of the continuous-fiber sheet located on an outer peripheral side of the first portion-to-be-pressed against the second recessed surface. Bringing the continuous-fiber sheet into close contact with the main surface may include pulling the second portion-to-be-pressed after pressing the first portion-to-be-pressed against the first recessed surface.

This manufacturing method involves pressing the second portion-to-be-pressed against the second recessed surface after pressing the first portion-to-be-pressed against the first recessed surface. Thus, even when the continuous-fiber sheet becomes lifted up as a result of pressing the first portion-to-be-pressed against the first recessed surface, the lifted portion of the continuous-fiber sheet can be smoothed out as the second portion-to-be-pressed is pressed. Thereafter, the second portion-to-be-pressed is pressed against the second recessed surface. Thus, it is possible to manufacture a molded article containing a continuous-fiber sheet in which a plurality of stepped portions or recessed or raised portions is formed, and to reduce the formation of wrinkles etc. in the continuous-fiber sheet.

The molded article molding device and the molded article manufacturing method according to the present disclosure can form a molded article containing a continuous-fiber sheet in which a stepped portion or a recessed or raised portion is formed, and can reduce the formation of wrinkles etc. in the continuous-fiber sheet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Molding devices according to embodiments will be described using FIG. 1 to FIG. 35. Those of components shown in FIG. 1 to FIG. 35 that are the same or substantially the same will be denoted by the same reference signs and an overlapping description will be omitted. Those of components shown in Embodiments 1 and 2 that correspond to components described in the claims may be accompanied by the components in the claims written in parentheses.

Embodiment 1

Figure 1:
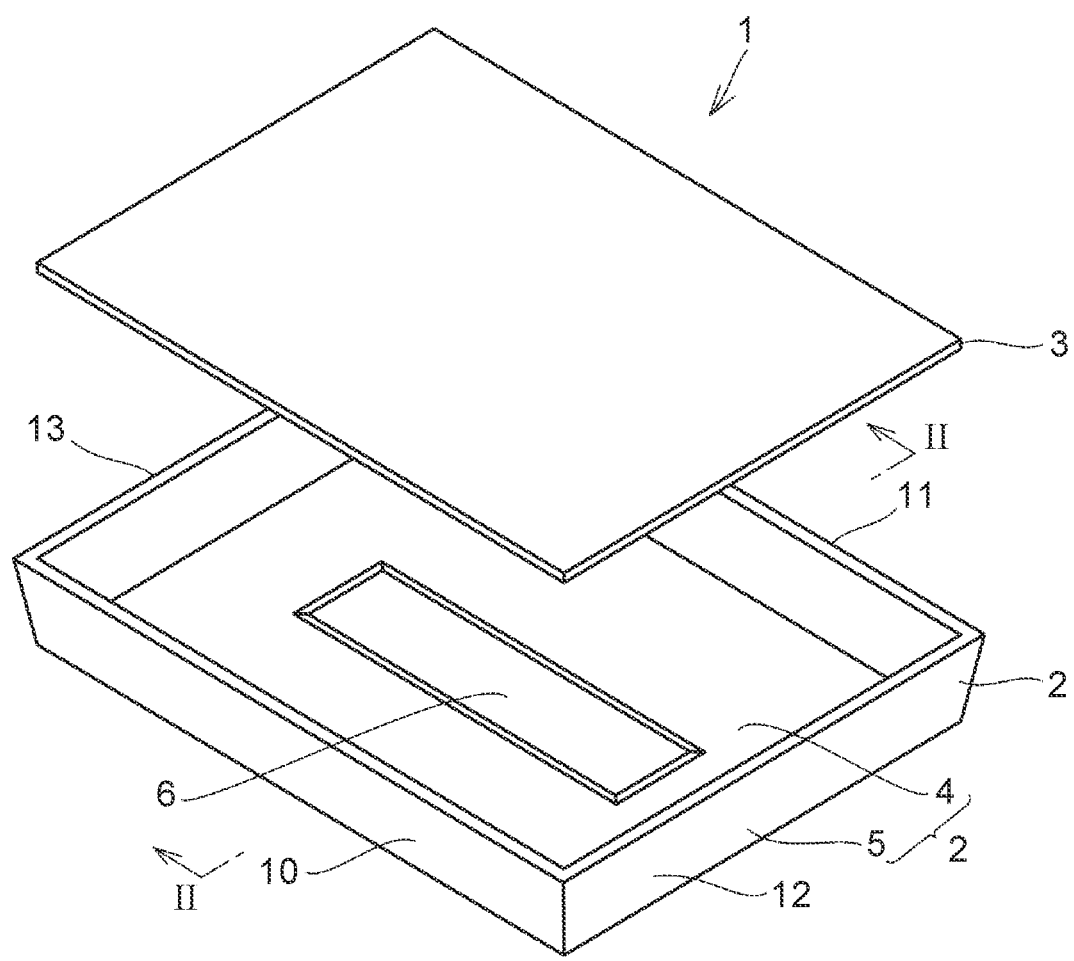
FIG. 1 is an exploded perspective view showing a housing case 1 of an electricity storage device.

FIG. 1 is an exploded perspective view showing a housing case 1 of an electricity storage device. The housing case 1 includes a case main body 2 and a lid 3. The case main body 2 has an opening that opens upward. As the lid 3 closes the opening of the case main body 2, a housing space to house a battery is formed inside the housing case 1. The lid 3 may be made of resin or metal.

Figure 2:
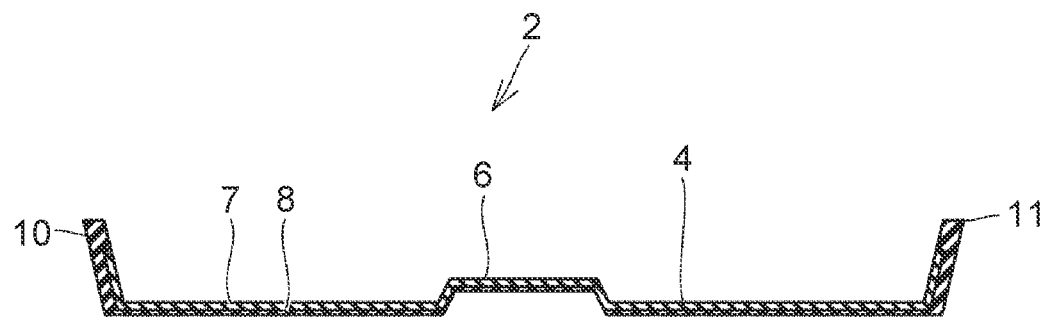
FIG. 2 is a sectional view of a case main body 2 taken along line II-II indicated in FIG. 1.

The case main body 2 includes a bottom plate 4 and a peripheral wall 5. An outer peripheral edge portion of the bottom plate 4 has substantially a rectangular shape. The peripheral wall 5 is formed so as to extend upward from the outer peripheral edge portion of the bottom plate 4. The peripheral wall 5 includes long-side walls 10, 11 formed along long sides of the bottom plate 4 and short-side walls 12, 13 formed along short sides of the bottom plate 4. FIG. 2 is a sectional view of the case main body 2 taken along line II-II indicated in FIG. 1.

A projection 6 projecting upward is formed at a center part of the bottom plate 4. Forming the projection 6 can enhance the rigidity of the case main body 2 compared with a case main body in which the projection 6 is not formed. Thus, the projection 6 as a raised portion is formed in the bottom plate 4 of the case main body 2 according to Embodiment 1.

The long-side wall 10 and the long-side wall 11 are formed so as to incline, with the distance between the long-side wall 10 and the long-side wall 11 increasing upward from the outer peripheral edge portion of the bottom plate 4. Similarly, the short-side wall 12 and the short-side wall 13 are formed so as to incline. Thus, the peripheral wall 5 is formed such that the opening area expands upward. In Embodiment 1, the case main body 2 is a molded article.

The case main body 2 includes a continuous-fiber part 7 and a resin part 8. The resin part 8 forms an outer peripheral surface of the case main body 2, and the continuous-fiber part 7 is placed on an inner peripheral surface of the resin part 8. Accordingly, a projection as a raised portion projecting upward is also formed in the continuous-fiber part 7. The continuous-fiber part 7 is made of one of carbon fibers, glass fibers, and alumina fibers, or of mixed fibers that are a mixture of these fibers. For example, the length of fibers of the continuous-fiber part 7 is longer than half the length of the case main body 2 shown in FIG. 2 in a width direction (the left-right direction in FIG. 2).

Figure 3:
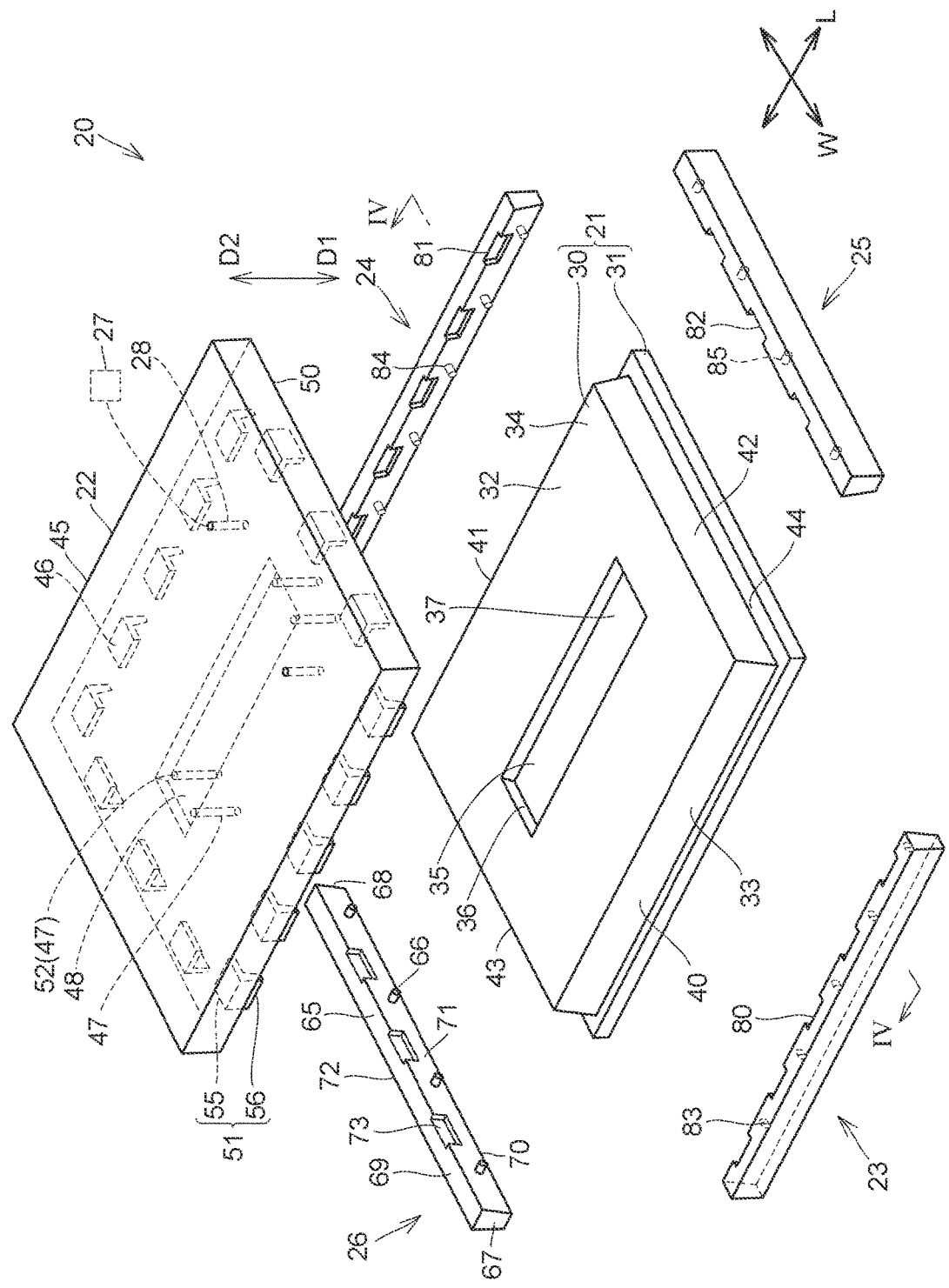
FIG. 3 is a perspective view schematically showing a molding device 20 for molding the case main body 2.
Figure 4:
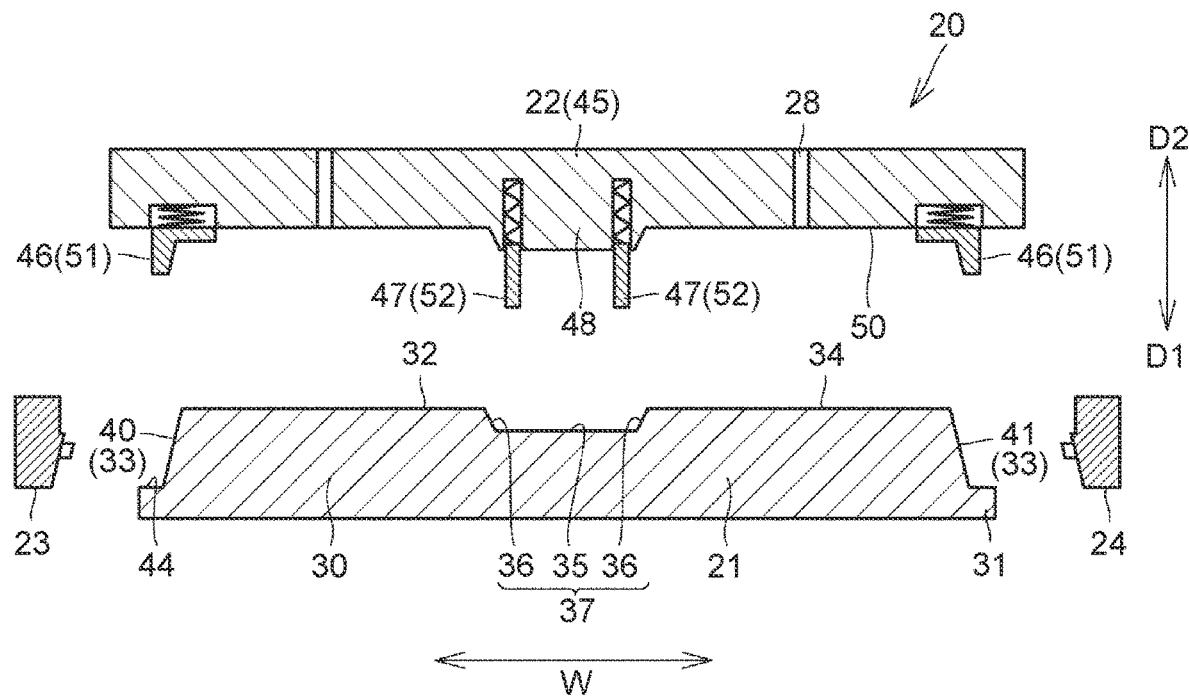
FIG. 4 is a sectional view taken along line IV-IV indicated in FIG. 3.

FIG. 3 is a perspective view schematically showing a molding device 20 for molding the case main body 2, and FIG. 4 is a sectional view taken along line IV-IV indicated in FIG. 3. The molding device 20 includes a mold (first mold) 21, a mold (second mold) 22 placed above the mold 21, and molds (third molds) 23, 24, 25, 26 placed around the mold 21, and a resin supply device 27.

The mold 22 is formed so as to be movable in an approaching direction D1 in which the mold 22 is brought closer to the mold 21 as well as in a separating direction D2 in which the mold 22 is separated farther away from the mold 21. Specifically, when a molded article is produced with the mold 21 fixed on the lower side and the mold 22 placed on the upper side, the approaching direction D1 is a downward direction and the separating direction D2 is an upward direction. In this embodiment, the position of the mold 21 is fixed.

The mold 21 includes a mold main body 30 and a flange 31. The mold main body 30 has substantially a flat plate shape. The mold main body 30 includes a placing surface 32 on which a continuous-resin sheet to be described later is placed, and a peripheral surface 33.

A recessed portion 37 is formed at a center part of the placing surface 32, and an opening of the recessed portion 37 is formed in the placing surface 32. The placing surface 32 includes a main surface 34 that is a flat surface, and an inner surface of the recessed portion 37.

The inner surface of the recessed portion 37 includes a recessed surface 35 that is a flat surface, and an inner-side surface 36 that connects the recessed surface 35 and the main surface 34 to each other.

The recessed surface 35 is located on a farther side in the approaching direction D1 than the main surface 34. The inner-side surface 36 connects the recessed surface 35 and the main surface 34 to each other, and specifically is formed so as to connect an outer peripheral edge portion of the recessed surface 35 and the opening of the recessed portion 37 to each other.

The peripheral surface 33 extends from the outer peripheral edge portion of the placing surface 32 in a direction away from the mold 22. The outer peripheral edge portion of the placing surface 32 has substantially a rectangular shape, and the peripheral surface 33 includes long-side surfaces 40, 41 and short-side surfaces 42, 43.

The long-side surface 40 and the long-side surface 41 are arranged on opposite sides in a width direction W. The long-side surface 40 and the long-side surface 41 are formed so as to incline, with the distance between the long-side surfaces 40, 41 increasing downward from the outer peripheral edge portion of the placing surface 32. The short-side surface 42 and the short-side surface 43 are arranged on opposite sides in a longitudinal direction L, and like the long-side surfaces 40, 41, the short-side surface 42 and the short-side surface 43 are formed so as to incline.

The flange 31 is formed on a lower surface side of the mold main body 30. The flange 31 is formed in a ring-like shape along lower edges of the mold main body 30, and the flange 31 is formed so as to project outward from the mold main body 30.

An upper surface 44 of the flange 31 functions as a mounting surface on which the molds 23, 24, 25, 26 are mounted during the production of a molded article.

The mold 22 includes a mold main body 45 having substantially a plate shape, and a pulling member 46 and a pressing member 47 that are provided on a lower surface 50 of the mold main body 45.

The mold main body 45 has a flat plate shape, and a raised portion 48 is formed on the lower surface 50 of the mold main body 45. The raised portion 48 is formed so as to protrude toward the recessed surface 35 of the mold 21.

The pulling member 46 includes a plurality of contact members 51. The contact members 51 are placed at intervals along an outer peripheral edge portion of the lower surface 50, and the contact members 51 are provided in a ring-like arrangement.

The pressing member 47 is provided on the raised portion 48. The pressing member 47 includes a plurality of support pins 52. Each support pin 52 is provided in the vicinity of a corner of a lower surface of the raised portion 48.

Figure 5:
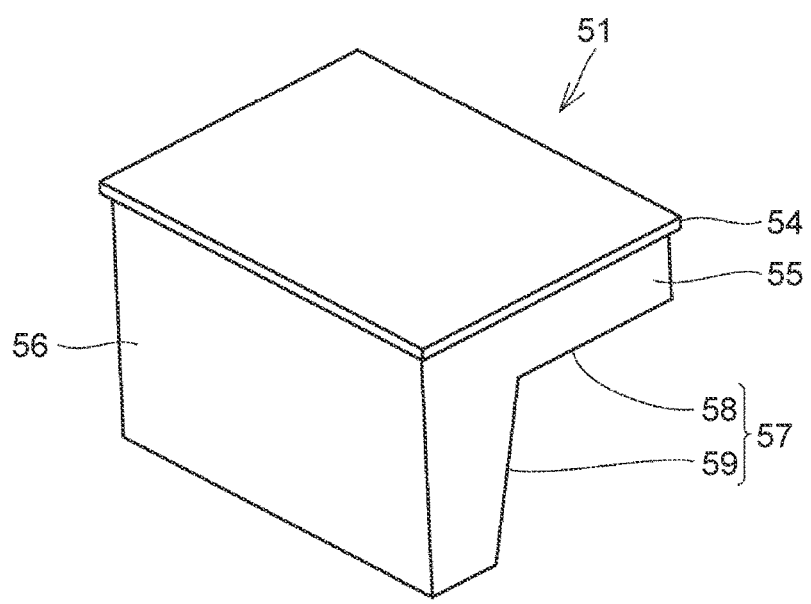
FIG. 5 is a perspective view showing a contact member 51.

FIG. 5 is a perspective view showing the contact member 51. The contact member 51 includes a base seat 55 and a protrusion 56. A ring-like projection 54 projecting outward is formed on an upper surface side of the base seat 55. The protrusion 56 is formed so as to protrude downward from a lower surface 58 of the base seat 55.

An inner surface 57 of the contact member 51 is formed by the lower surface 58 of the base seat 55 and an inner-side surface 59 of the protrusion 56. The lower surface 58 is formed as a flat surface like the main surface 34 of the mold 21 shown in FIG. 4. The inner-side surface 59 is formed so as to extend along the peripheral surface 33 of the mold 21 shown in FIG. 4. In the contact member 51 shown in FIG. 5, the inner-side surface 59 is formed so as to extend along the long-side surface 40.

Figure 6:
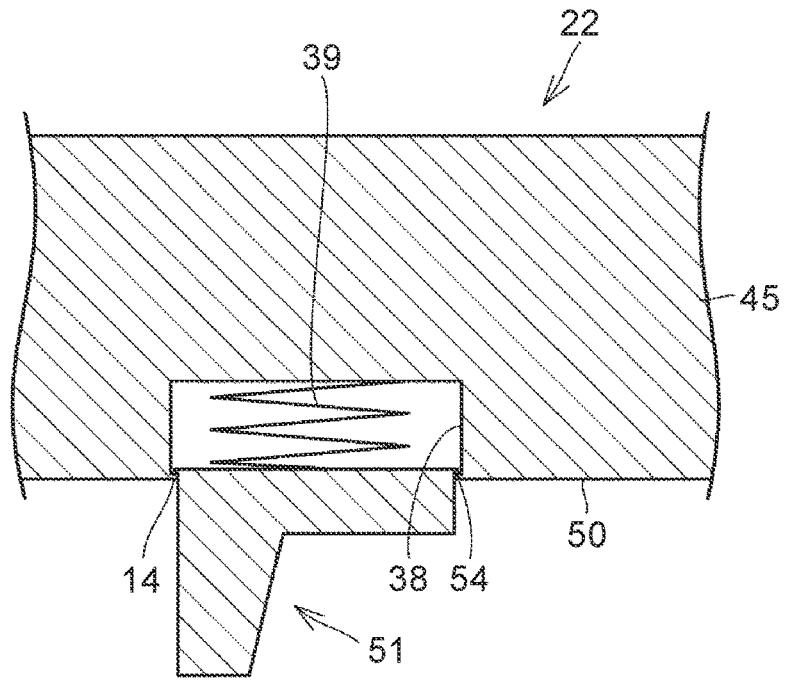
FIG. 6 is a sectional view showing the configuration of the contact member 51 and a surrounding part in a mold 22.

The contact members 51 thus configured are provided on the mold 22. FIG. 6 is a sectional view showing the configuration of the contact member 51 and a surrounding part in the mold 22.

A hole 38 is formed in the lower surface 50 of the mold 22. An opening of the hole 38 is formed in the lower surface 50, and a protrusion 14 is formed along an edge of the opening.

The contact member 51 is inserted in the hole 38, and the contact member 51 is prevented from falling out of the hole 38 as the projection 54 of the contact member 51 engages with the protrusion 14.

An urging member 39 is inserted in the hole 38, and the contact member 51 is urged downward by the urging member 39.

For example, the urging member 39 is a spring. However, various devices can be adopted as the means for urging the contact member 51 downward.

Figure 7:
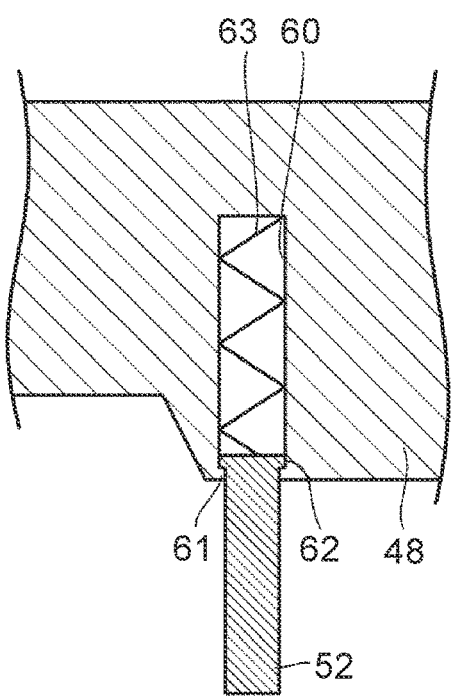
FIG. 7 is a sectional view showing the configuration of a support pin 52 and a surrounding part.

FIG. 7 is a sectional view showing the configuration of the support pin 52 and a surrounding part. A hole 60 extending upward from the lower surface of the raised portion 48 is formed in the raised portion 48. The hole 60 is closed at an upper end side. A protrusion 61 formed so as to reduce the opening area of the hole 60 is formed in the lower surface of the raised portion 48.

The support pin 52 of the pressing member 47 is inserted in the hole 60, and a projection 62 is formed at an upper end of the support pin 52. The support pin 52 is prevented from falling out of the hole 60 as the projection 62 comes into contact with the protrusion 61.

An urging member 63 is provided inside the hole 60, and the urging member 63 urges the support pin 52 downward. Thus, when no external force is applied to the support pin 52, the pressing member 47 protrudes downward. In this embodiment, the urging member 63 is an elastic member, such as a spring, but various devices etc. can be used to urge the support pin 52 downward.

Referring back to FIG. 3, the molds 23, 24 have shapes elongated in the longitudinal direction L along the long-side surfaces 40, 41, and the molds 25, 26 have shapes elongated in the width direction W along the short-side surfaces 42, 43.

The mold 23 is movable in the width direction W, that is, in a direction in which the mold 23 is brought closer to the long-side surface 40 and in a direction in which the mold 23 is separated farther away from the long-side surface 40. The mold 24 is movable in a direction in which the mold 24 is brought closer to the long-side surface 41 and in a direction in which the mold 24 is separated farther away from the long-side surface 41. Similarly, the molds 25, 26 are movable in directions in which the molds 25, 26 are respectively brought closer to the short-side surfaces 42, 43 and in directions in which the molds 25, 26 are respectively separated farther away from the short-side surfaces 42, 43.

Since the molds 23, 24, 25, 26 are similar in structure, the mold 26 will be mainly described.

The mold 26 includes a mold main body 65 that has a shape elongated in the width direction W and a plurality of pressing pins 66 that is formed on the mold main body 65.

The mold main body 65 includes end surfaces 67, 68, an upper surface 69, a lower surface 70, an inner-side surface 71, and an outer-side surface 72. The end surfaces 67, 68 are end surfaces arranged on opposite sides in the width direction W. The inner-side surface 71 is a surface facing the short-side surface 43. The pressing pins 66 are formed on the inner-side surface 71, and the pressing pins 66 are placed at intervals in an extension direction of the mold 26.

A plurality of recessed portions 73 is formed in the mold main body 65, and the recessed portions 73 are formed at intervals in the extension direction of the mold 26.

Each recessed portion 73 is formed across the border between the inner-side surface 71 and the upper surface 69. The recessed portion 73 is formed so as to be able to receive a portion of a lower end of the protrusion 56 of the contact member 51. The pressing pins 66 are formed alternately with the recessed portions 73 in the extension direction of the mold 26.

Figure 8:
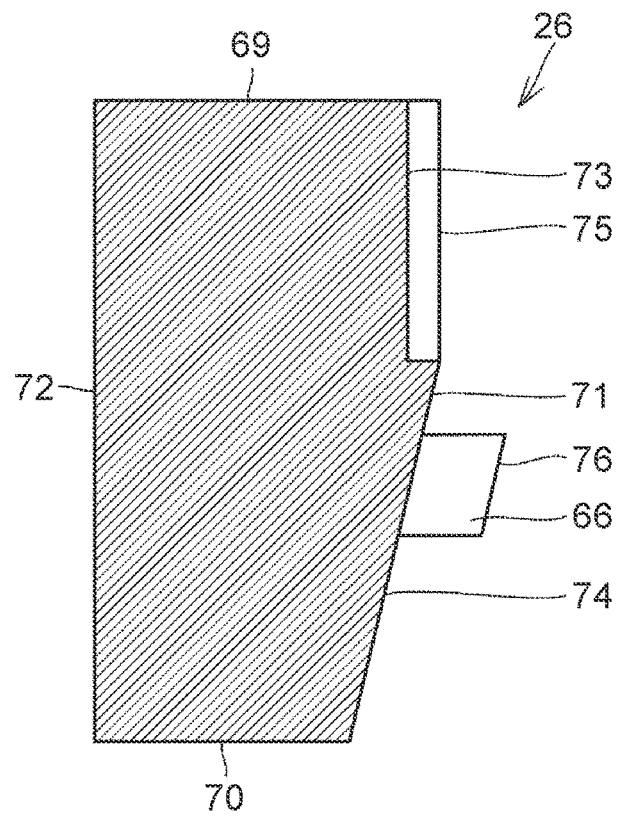
FIG. 8 is a sectional view showing a mold 26.

FIG. 8 is a sectional view showing the mold 26. The inner-side surface 71 includes an inclined surface 74 and a vertical surface 75. The inclined surface 74 inclines so as to separate farther away from the outer-side surface 72 as the inclined surface 74 extends from the lower surface 70 toward the upper surface 69. The vertical surface 75 is formed so as to extend in a vertical direction from an upper side of the inclined surface 74.

The pressing pin 66 is formed on the inclined surface 74. The pressing pin 66 is formed so as to protrude from the inclined surface 74. A leading end surface 76 of the pressing pin 66 is an inclined surface similar in inclination to the short-side surface 43 shown in FIG. 3.

While the mold 26 has been described in detail, the other molds 23, 24, 25 shown in FIG. 3 are similar in structure to the mold 26.

Recessed portions 80, 81, 82 corresponding to the recessed portions 73 of the mold 26 and pressing pins 83, 84, 85 corresponding to the pressing pins 66 are formed in the molds 23, 24, 25, respectively.

The resin supply device 27 is connected to a resin supply path 28 formed in the mold 22. The resin supply path 28 opens in the lower surface 50 of the mold 22.

Figure 9:
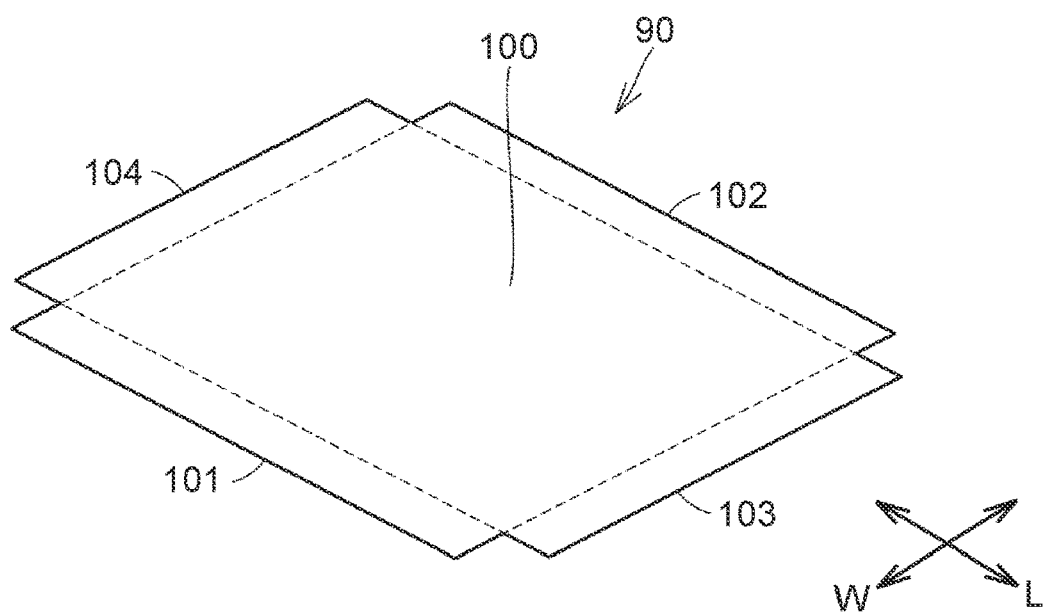
FIG. 9 is a perspective view showing a continuous-fiber sheet 90 in a state before being molded by the molding device 20.

FIG. 9 is a perspective view showing a continuous-fiber sheet 90 in a state before being molded by the molding device 20. The continuous-fiber sheet 90 includes a main body 100 and a plurality of side portions 101, 102, 103, 104.

The main body 100 has substantially a rectangular shape. The side portion 101 and the side portion 102 are connected to long-side portions of the main body 100. The side portion 103 and the side portion 104 are connected to short-side portions of the main body 100.

The continuous-fiber sheet 90 is made of one of carbon fibers, glass fibers, and alumina fibers, or of mixed fibers that are a mixture of these fibers.

A molding process of molding the case main body (molded article) 2 by using the molding device 20 having the above-described configuration will be described.

Figure 10:
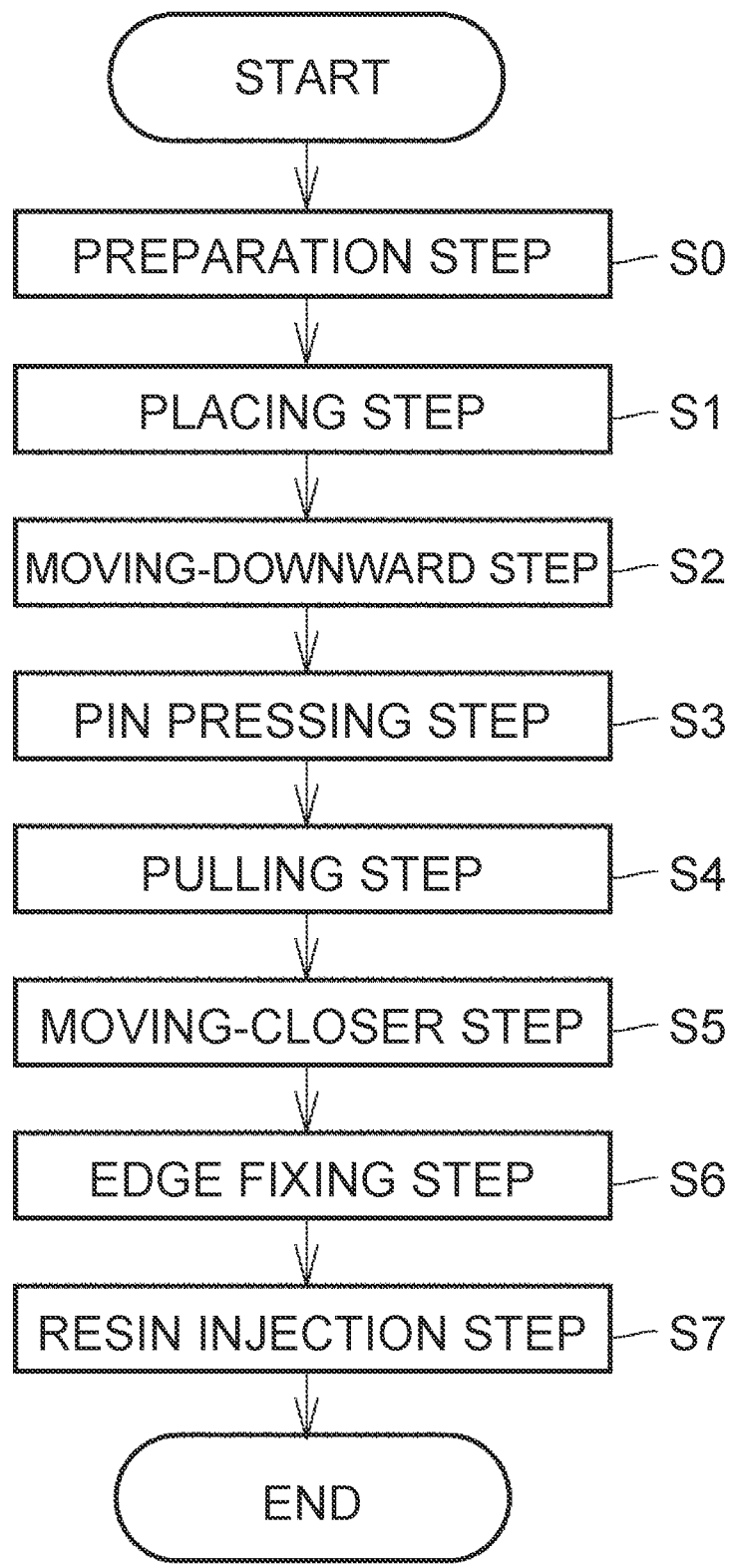
FIG. 10 is a process flowchart showing a molding process of the case main body 2.

FIG. 10 is a process flowchart showing the molding process of the case main body 2. The molding process of the case main body 2 includes a preparation step S0, a placing step S1, a moving-downward step S2, a pin pressing step S3, a pulling step S4, a moving-closer step S5, an edge fixing step S6, and a resin injection step S7.

The preparation step S0 is a step of preparing the molding device 20 including the mold 21, the mold 22, and others as shown in FIG. 4 etc. Specifically, in the preparation step S0, the mold 22 is set in a state of being separated from the mold 21 in the separating direction D2.

Figure 11:
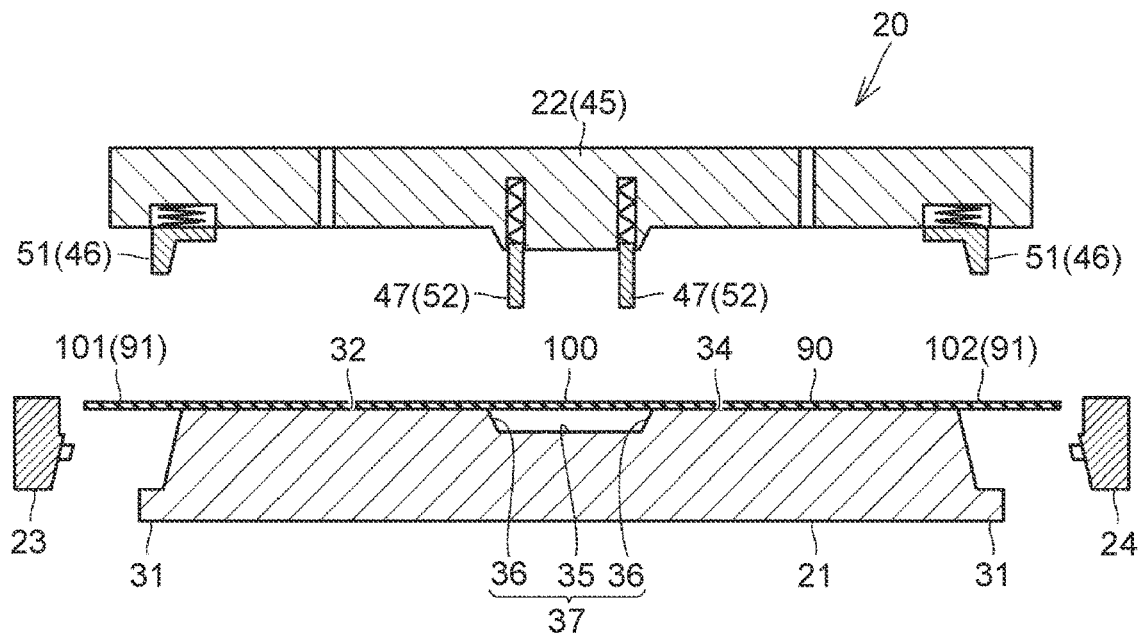
FIG. 11 is a sectional view showing the molding device 20 and the continuous-fiber sheet 90 in a placing step 51.
Figure 12:
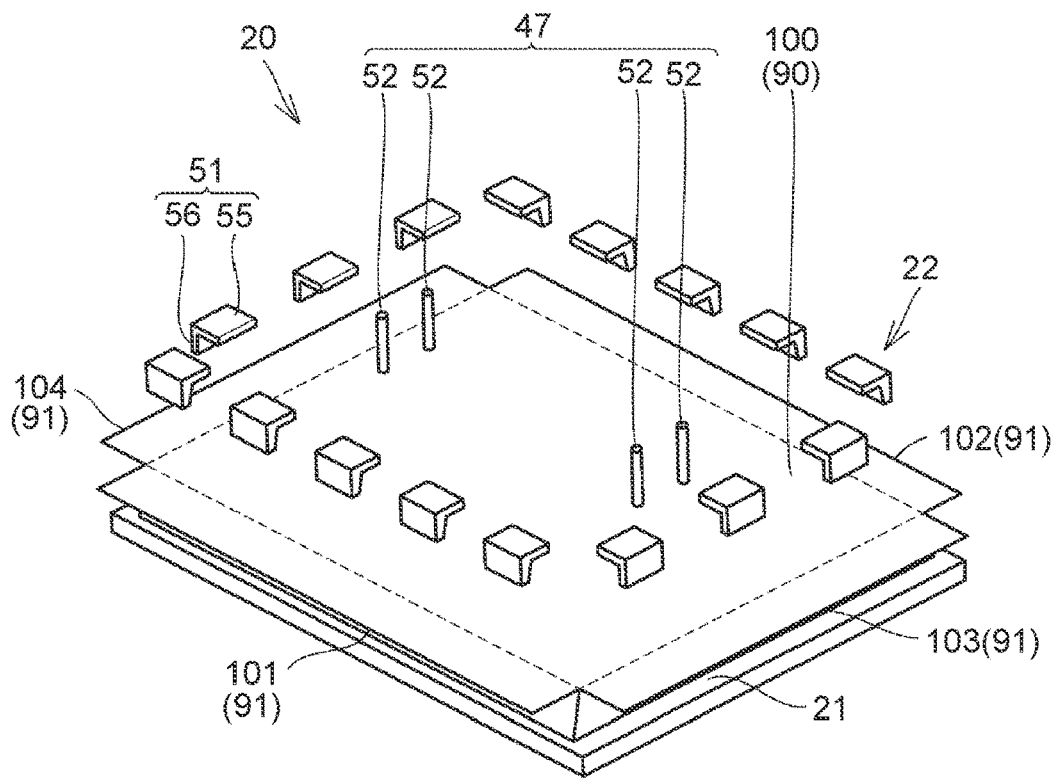
FIG. 12 is a perspective view schematically showing the molding device 20 and the continuous-fiber sheet 90 in the placing step 51.

FIG. 11 is a sectional view showing the molding device 20 and the continuous-fiber sheet 90 in the placing step S1, and FIG. 12 is a perspective view schematically showing the molding device 20 and the continuous-fiber sheet 90 in the placing step S1. In FIG. 12 etc., only the contact members 51 and the support pins 52 of the mold 22 are shown.

In the placing step S1, the continuous-fiber sheet 90 is placed between the mold 21 and the mold 22. Specifically, the continuous-fiber sheet 90 is placed on the placing surface 32 of the mold 21.

The continuous-fiber sheet 90 has a certain degree of hardness, and the continuous-fiber sheet 90 has a plate shape.

Therefore, the continuous-fiber sheet 90 in the placing step S1 is in a state of being placed on the main surface 34 without entering the recessed portion 37. Of the continuous-fiber sheet 90 in the state of being placed on the placing surface 32, the main body 100 is located on the placing surface 32 and the side portions 101, 102, 103, 104 project from the outer peripheral edge portion of the placing surface 32.

An outer peripheral portion 91 of the continuous-fiber sheet 90 refers to a portion located on an outer side of the outer peripheral edge portion of the placing surface 32 in the state where the continuous-fiber sheet 90 is placed on the placing surface 32.

Accordingly, in Embodiment 1, the outer peripheral portion 91 of the continuous-fiber sheet 90 is composed of the side portions 101, 102, 103, 104.

Figure 13:
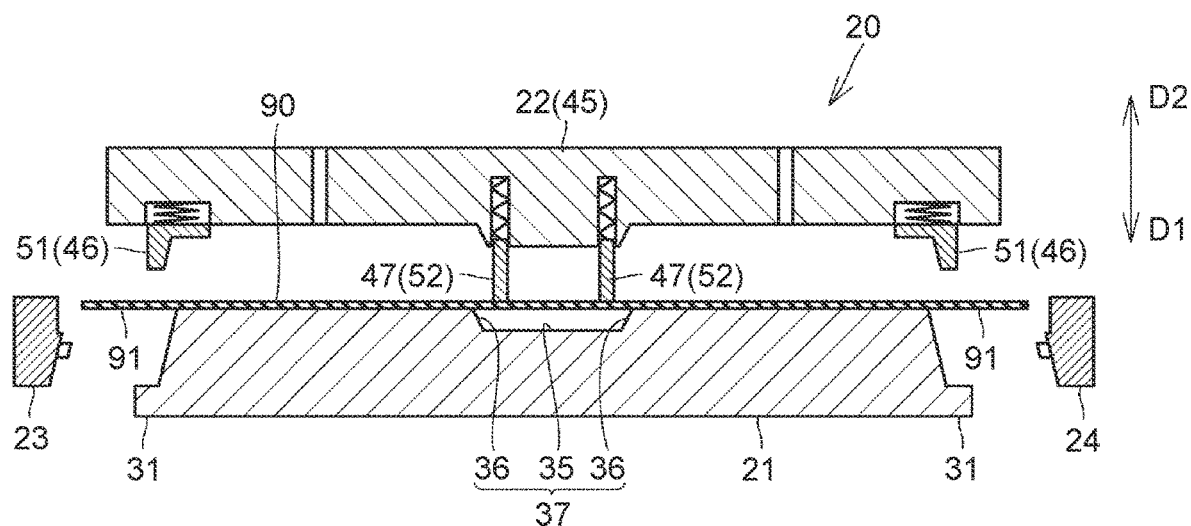
FIG. 13 is a sectional view showing the molding device 20 and the continuous-fiber sheet 90 in a moving-downward step S2.
Figure 14:
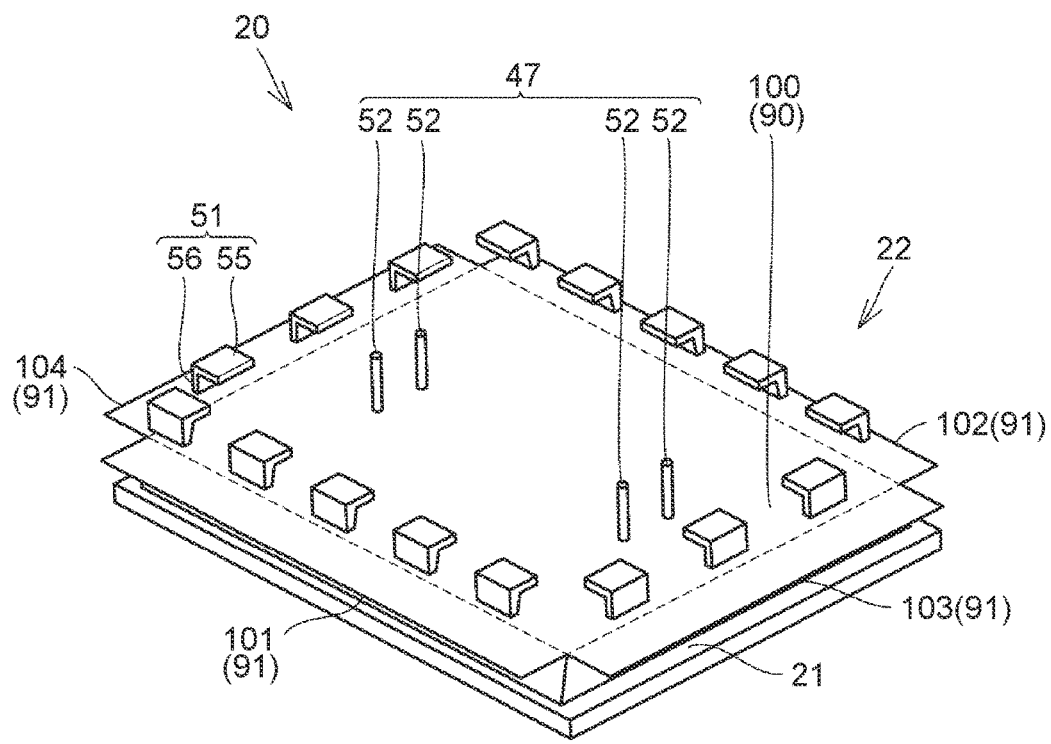
FIG. 14 is a perspective view schematically showing the molding device 20 and the continuous-fiber sheet 90 in the moving-downward step S2.

FIG. 13 is a sectional view showing the molding device 20 and the continuous-fiber sheet 90 in the moving-downward step S2, and FIG. 14 is a perspective view schematically showing the molding device 20 and the continuous-fiber sheet 90 in the moving-downward step S2.

In the moving-downward step S2, the mold 22 is shifted in the approaching direction D1 so as to come closer to the mold 21. Then, the support pins 52 come into contact with the continuous-fiber sheet 90. At the time when the support pins 52 come into contact with the continuous-fiber sheet 90, the contact members 51 are located above the continuous-fiber sheet 90, and therefore the contact members 51 are not in contact with the continuous-fiber sheet 90.

Figure 15:
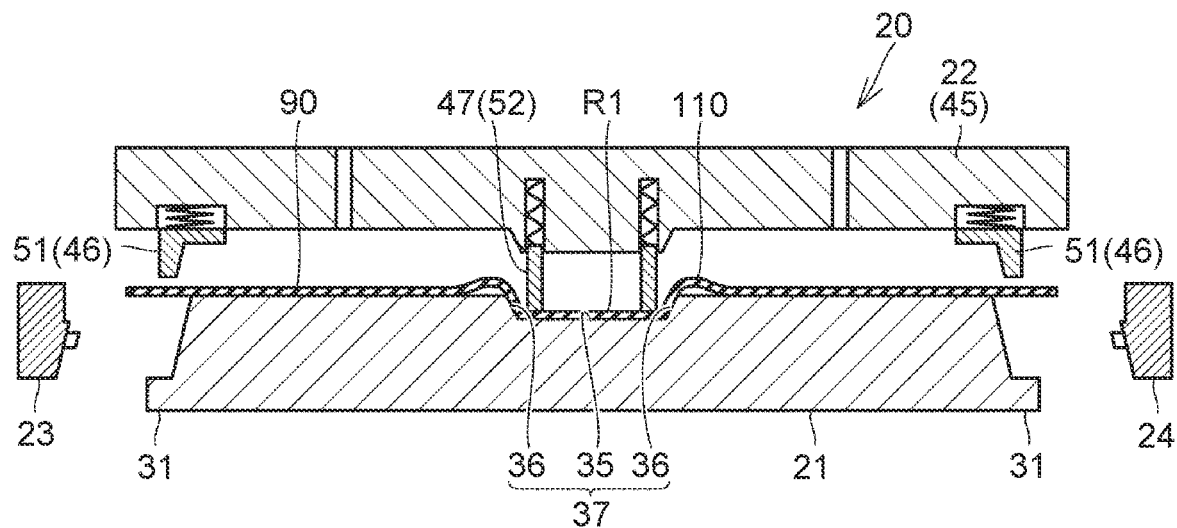
FIG. 15 is a sectional view showing the molding device 20 and the continuous-fiber sheet 90 in a pin pressing step S3.
Figure 16:
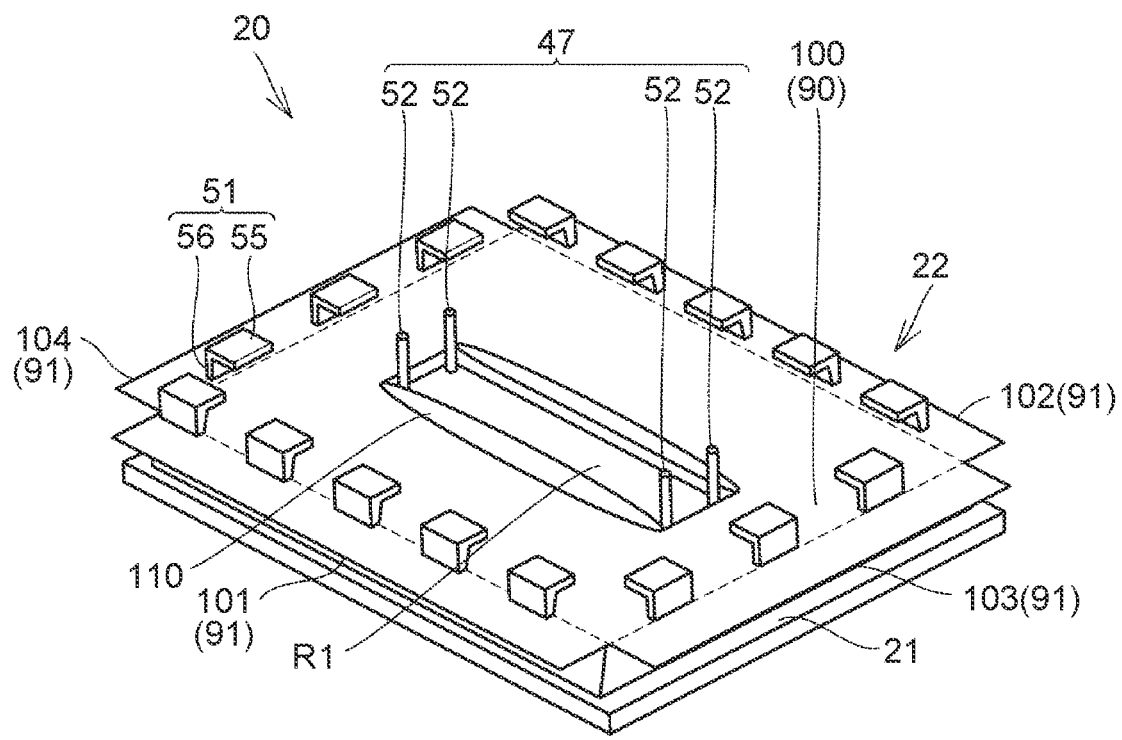
FIG. 16 is a perspective view schematically showing the molding device 20 and the continuous-fiber sheet 90 in the pin pressing step S3.

FIG. 15 is a sectional view showing the molding device 20 and the continuous-fiber sheet 90 in the pin pressing step S3, and FIG. 16 is a perspective view schematically showing the molding device 20 and the continuous-fiber sheet 90 in the pin pressing step S3.

In the pin pressing step S3, the mold 22 is moved further downward from the state shown in the moving-downward step S2. Thus, the support pins 52 press the continuous-fiber sheet 90 against the recessed surface 35 of the recessed portion 37.

The recessed surface 35 has substantially a rectangular shape, and the support pins 52 press the continuous-fiber sheet 90 against the recessed surface 35 in the vicinity of the corners of the recessed surface 35. As the support pins 52 press the continuous-fiber sheet 90 at the corners of the recessed surface 35, a portion-to-be-pressed R1 of the continuous-fiber sheet 90 defined by connecting the support pins 52 is pressed against the recessed surface 35.

When the portion-to-be-pressed R1 is pressed against the recessed surface 35 by the support pins 52, the continuous-fiber sheet 90 may become lifted up from the placing surface 32.

In the example shown in FIG. 15 and FIG. 16, portions of the main body 100 of the continuous-fiber sheet 90 are lifted up from the main surface 34 in the vicinity of the opening of the recessed portion 37. Specifically, bulges 110 are formed in the vicinity of the opening of the recessed portion 37. At this point, lower ends of the contact members 51 of the pulling member 46 are located above the continuous-fiber sheet 90.

Figure 17:
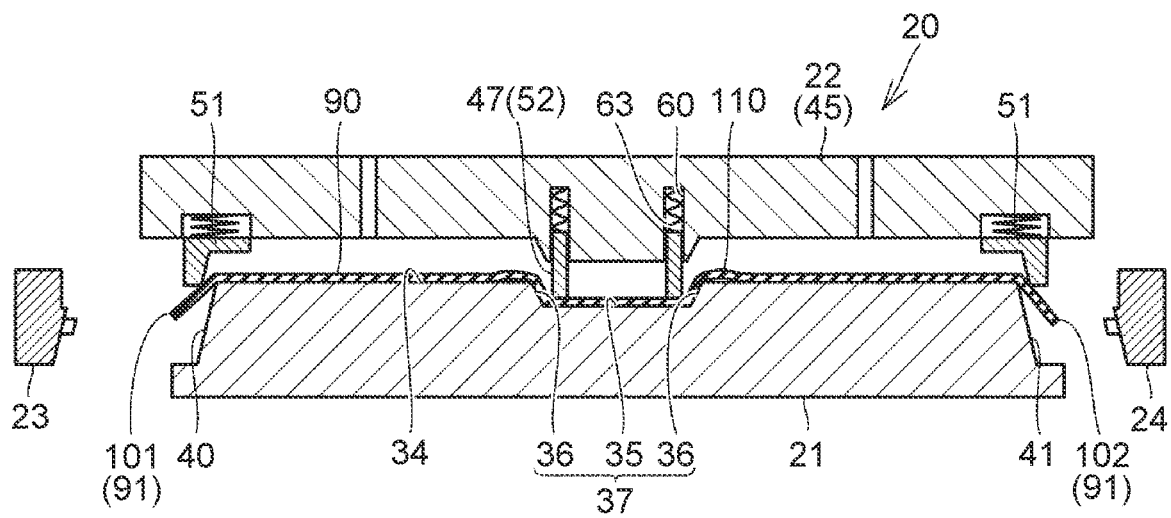
FIG. 17 is a sectional view showing the molding device 20 and the continuous-fiber sheet 90 in a pulling step S4.
Figure 18:
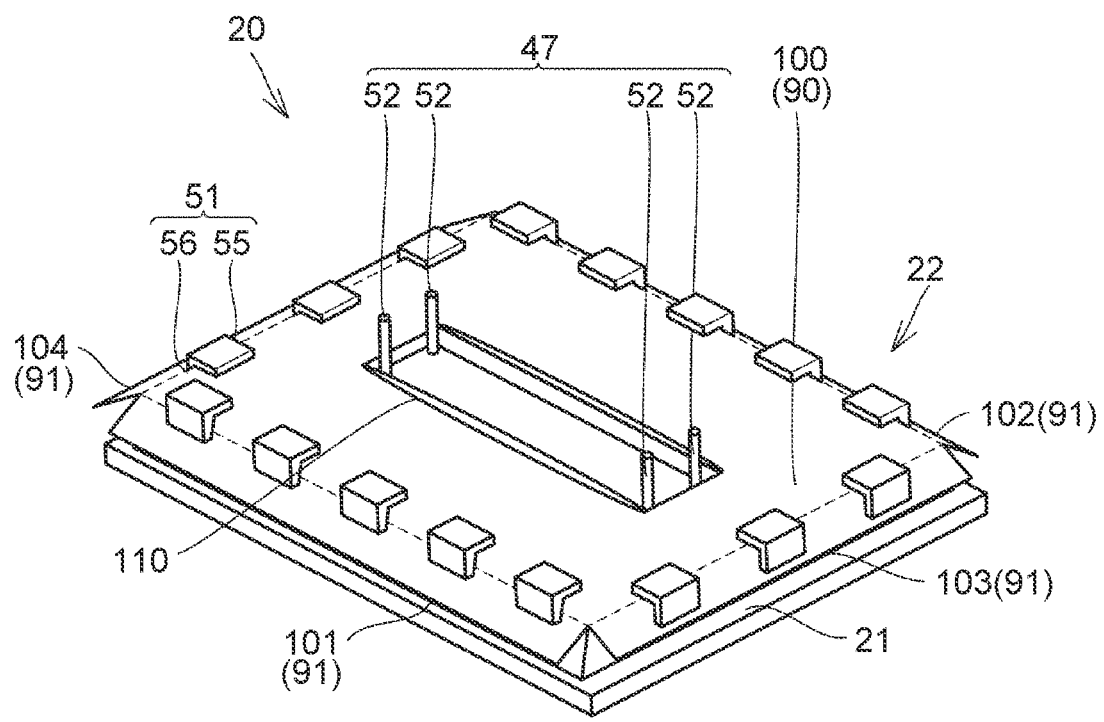
FIG. 18 is a perspective view schematically showing the molding device 20 and the continuous-fiber sheet 90 in the pulling step S4.

FIG. 17 is a sectional view showing the molding device 20 and the continuous-fiber sheet 90 in the pulling step S4, and FIG. 18 is a perspective view schematically showing the molding device 20 and the continuous-fiber sheet 90 in the pulling step S4.

In the pulling step S4, the mold 22 is moved further downward from the state shown in the pin pressing step S3. Meanwhile, the support pins 52 of the pressing member 47 are not moved and the urging members 63 are deformed so as to contract, so that the support pins 52 start to enter the holes 60.

On the other hand, the lower ends of the contact members 51 come into contact with the outer peripheral portion 91 of the continuous-fiber sheet 90, and moreover, the lower ends of the contact members 51 press the outer peripheral portion 91 of the continuous-fiber sheet 90 downward.

Since the contact members 51 are provided at intervals along the outer peripheral edge portion of the mold 22, the side portions 101, 102, 103, 104 composing the outer peripheral portion 91 are pressed downward by the contact members 51.

Figure 19:
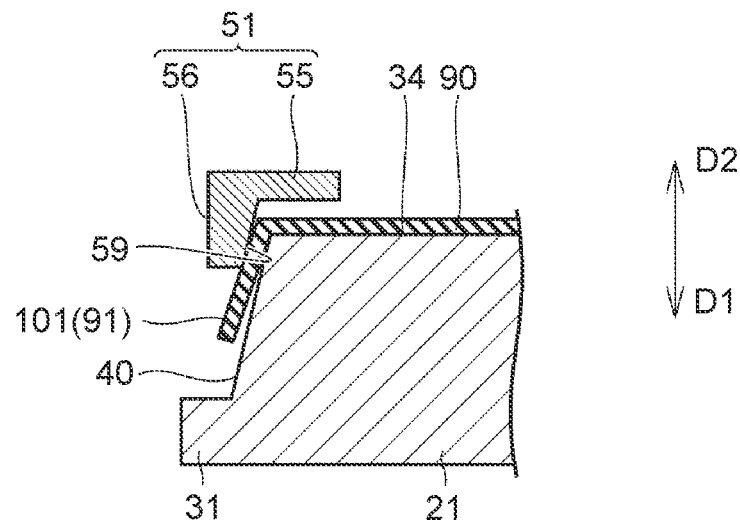
FIG. 19 is a sectional view showing the configuration of a side portion 101 and a surrounding part in an initial state in the pulling step S4.

FIG. 19 is a sectional view showing the configuration of the side portion 101 and a surrounding part in an initial state in the pulling step S4. The side portion 101 is pressed downward by the lower ends of the protrusions 56 of the contact members 51, and the side portion 101 is thereby bent at the border between the long-side surface 40 and the main surface 34.

Then, the contact members 51 are moved downward while the inner-side surfaces 59 of the contact members 51 and a surface of the side portion 101 are kept in contact with each other, so that the side portion 101 is pulled downward and the side portion 101 is drawn downward along the long-side surface 40.

Figure 20:
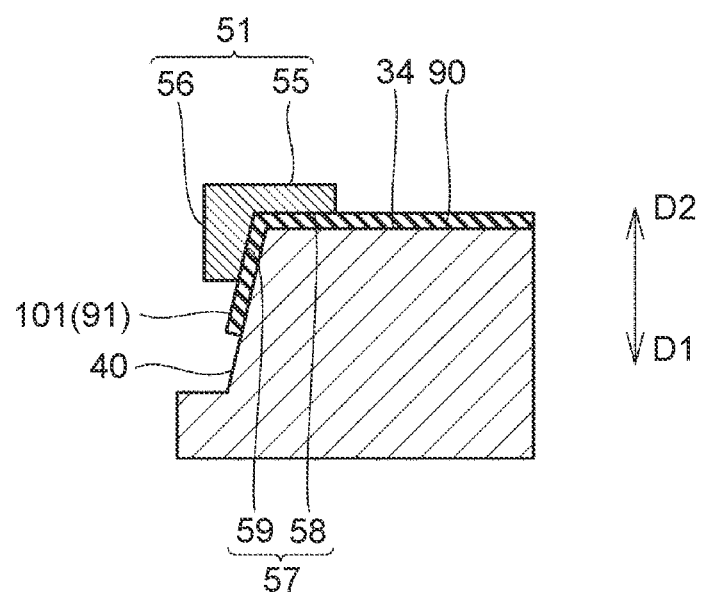
FIG. 20 is a sectional view showing the configuration of the side portion 101 and the surrounding part in the pulling step S4.

Then, as shown in FIG. 20, the lower surfaces 58 of the contact members 51 press an upper surface of the continuous-fiber sheet 90, which completes the pulling step S4.

Referring back to FIG. 18, in the pulling step S4, not only the side portion 101 but also the side portions 102, 103, 104 are pulled downward and moved downward in the same manner.

When the side portions 101, 102, 103, 104 are pulled downward, the main body 100 is pulled from the entire periphery of the main body 100. As a result, the bulges 110 having been formed in the main body 100 become smaller in the course of the pulling step S4.

Thus, the pulling force applied to the continuous-fiber sheet 90 in the process of making the bulges 110 smaller is a frictional force occurring between the contact members 51 and the side portions 101, 102, 103, 104, and therefore applying an excessive pulling force to the continuous-fiber sheet 90 is avoided. Accordingly, fracture of the continuous-fiber sheet 90 is avoided.

Figure 21:
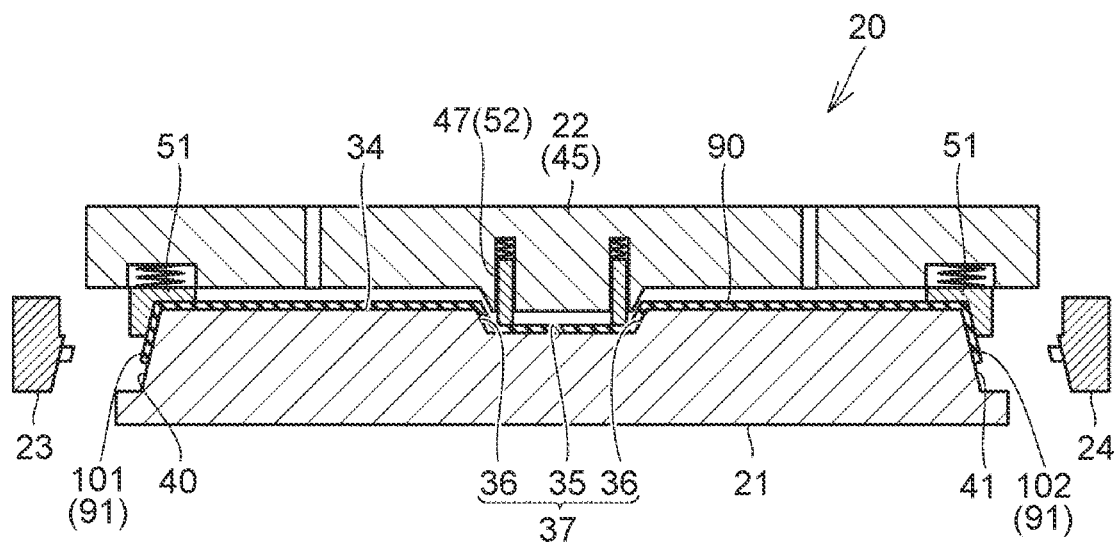
FIG. 21 is a sectional view showing the molding device 20 and the continuous-fiber sheet 90 in a state upon completion of the pulling step S4.
Figure 22:
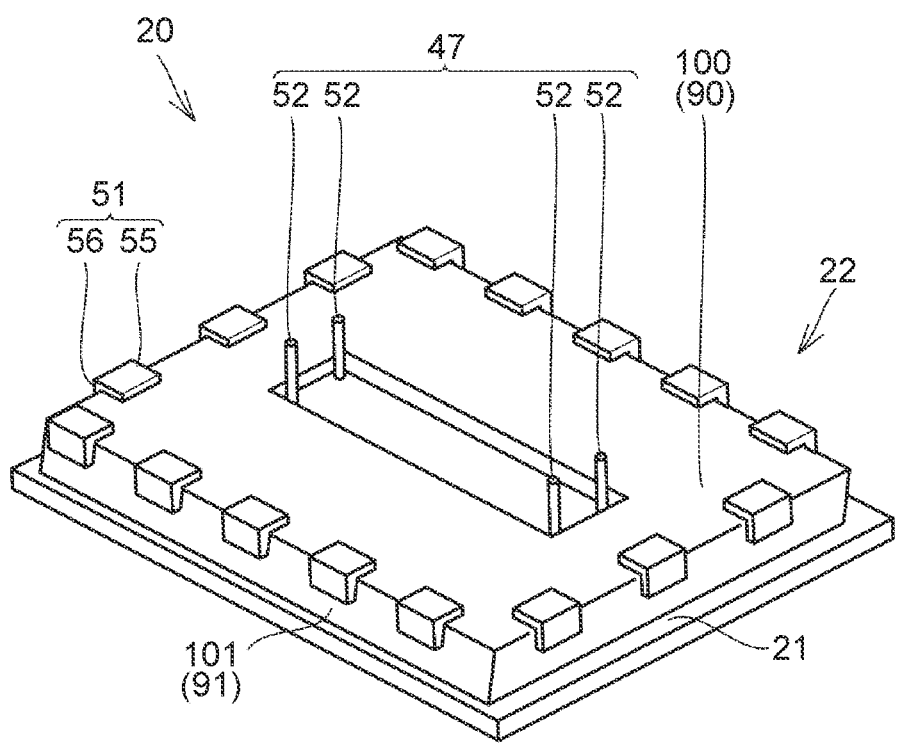
FIG. 22 is a perspective view schematically showing the state upon completion of the pulling step S4.

FIG. 21 is a sectional view showing the molding device 20 and the continuous-fiber sheet 90 in a state upon completion of the pulling step S4, and FIG. 22 is a perspective view schematically showing the state upon completion of the pulling step S4. As shown in FIG. 21 and FIG. 22, the bulges 110 having been formed in the main body 100 have disappeared in the state upon completion of the pulling step S4. As a result, the main body 100 comes into close contact with the main surface 34 and the inner surface of the recessed portion 37.

As has been described above, the portion-to-be-pressed R1 of the continuous-fiber sheet 90 is pressed against the recessed surface 35, and then the outer peripheral portion 91 of the continuous-fiber sheet 90 located on the outer peripheral side of the continuous-fiber sheet 90 relative to the portion-to-be-pressed R1 is pulled so as to bring the continuous-fiber sheet 90 into close contact with the main surface 34 and the connection surface 36. Thus, the formation of wrinkles etc. in the continuous-fiber sheet 90 is reduced.

Figure 23:
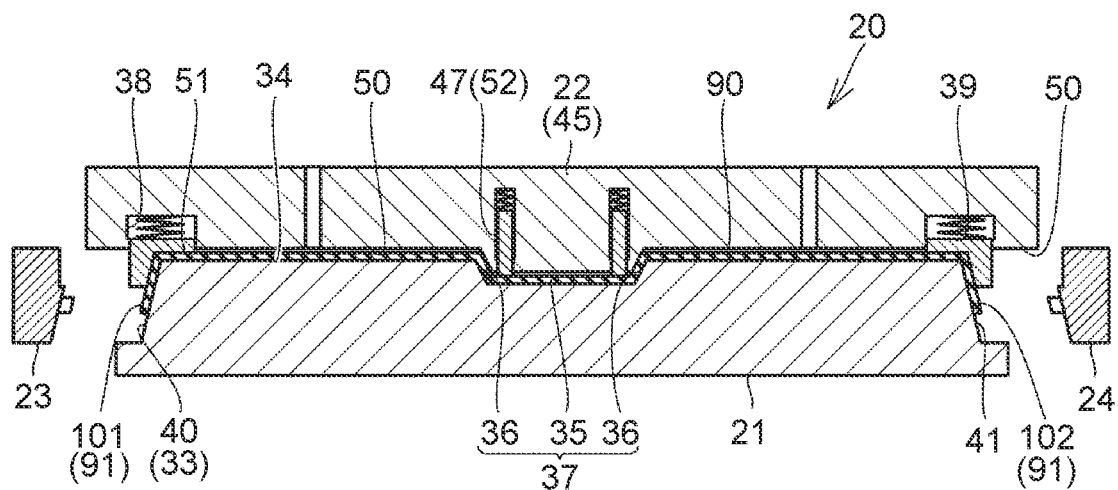
FIG. 23 is a sectional view showing the molding device 20 and the continuous-fiber sheet 90 in a moving-closer step S5.

FIG. 23 is a sectional view showing the molding device 20 and the continuous-fiber sheet 90 in the moving-closer step S5. In the moving-closer step S5, the mold 22 is shifted further downward from the state in the pulling step S4. Meanwhile, the positions of the contact members 51 are not shifted, so that the contact members 51 enter the holes 38 formed in the mold main body 45 and the urging members 39 are deformed so as to contract.

Thus, the urging force applied by the urging members 39 to the contact members 51 increases, and the pressing force with which the contact members 51 press the continuous-fiber sheet 90 against the main surface 34 increases. With the pressing force from the contact members 51 placed in a ring-like shape thus increasing, the state where the continuous-fiber sheet 90 is in close contact with the main surface 34 and the inner surface of the recessed portion 37 can be maintained.

As the urging force applied from the urging members 39 to the contact members 51 increases, the force with which the contact members 51 press the side portions 101, 102 against the peripheral surface 33 also increases, so that the side portions 101, 102 come into close contact with the peripheral surface 33. While the side portions 103, 104 are not shown in FIG. 23, the side portions 103, 104 also come into close contact with the peripheral surface 33.

The moving-closer step S5 is completed when the lower surface 50 of the mold main body 45 is located in the vicinity of the upper surface of the continuous-fiber sheet 90.

Figure 24:
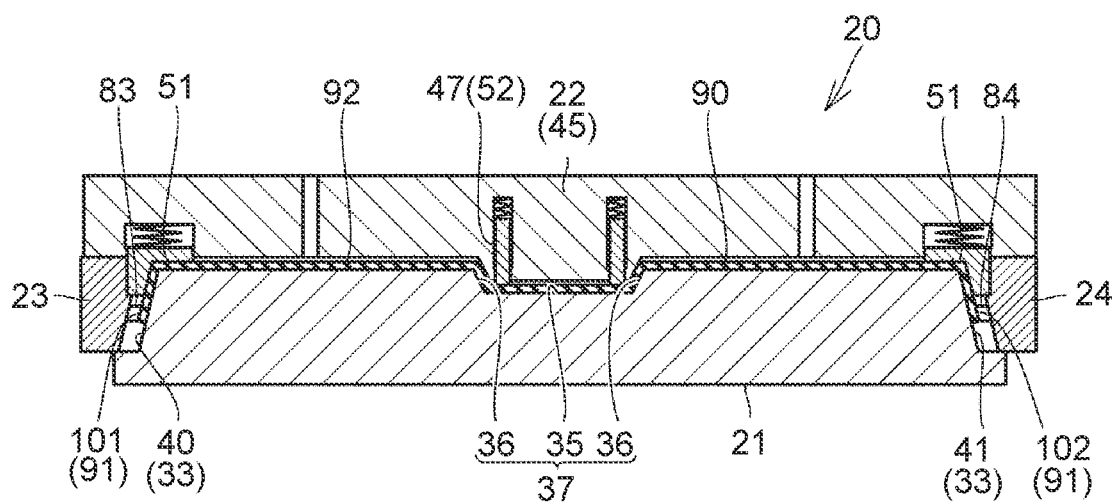
FIG. 24 is a sectional view showing the molding device 20 and the continuous-fiber sheet 90 in an edge fixing step S6.

FIG. 24 is a sectional view showing the molding device 20 and the continuous-fiber sheet 90 in the edge fixing step S6. In the edge fixing step S6, the molds 23, 24 are moved so as to come closer to the mold 21. The molds 25, 26 that are not shown in FIG. 24 are also moved so as to come closer to the mold 21.

Figure 25:
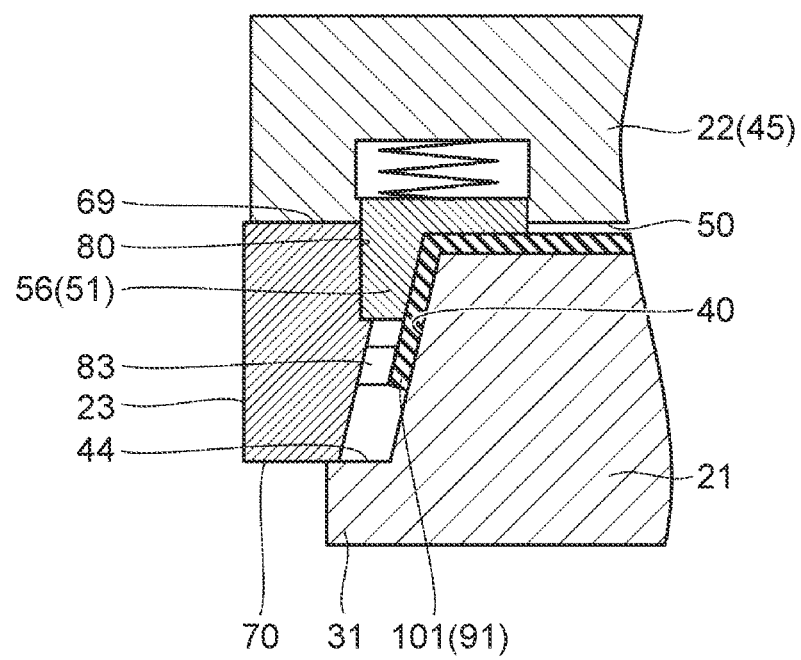
FIG. 25 is a sectional view showing the configuration of a mold 23 and a surrounding part in the state shown in FIG. 24.

FIG. 25 is a sectional view showing the configuration of the mold 23 and a surrounding part in the state shown in FIG. 24. The pressing pin 83 of the mold 23 presses an outer edge of the side portion 101 against the long-side surface 40. At this point, the mold 23 rests on the upper surface 44 of the flange 31, and the protrusion 56 of the contact member 51 enters the recessed portion 80 of the mold 23. As the mold main body 45 is moved slightly downward in this state, the upper surface 69 of the mold 23 comes into contact with the lower surface 50 of the mold main body 45.

Thus, the lower surface 50 of the mold 22 and the upper surface 69 of the mold 23 come into contact with each other and the upper surface 44 of the flange 31 and the lower surface 70 of the mold 23 come into contact with each other, so that a gap between the mold 22 and the mold 21 on the side of the long-side surface 40 is closed by the mold 23.

Referring back to FIG. 24, the pressing pins 84 of the mold 24 press an outer peripheral edge of the side portion 102 against the long-side surface 41. Similarly, the pressing pins 85, 66 of the molds 25, 26 shown in FIG. 4 press outer edges of the side portions 103, 104 against the short-side surfaces 42, 43, respectively. Thus, in the edge fixing step S6, the molds 23, 24, 25, 26 press the outer edges of the outer peripheral portion 91 of the continuous-fiber sheet 90 against the peripheral surface 33 of the mold 21.

In the edge fixing step S6, like the mold 23, the molds 24, 25, 26 are placed on the upper surface 44 of the flange 31 and come into contact with the lower surface 50 of the mold 22.

As a result, a cavity 92 is formed inside the molding device 20 by the molds 21, 22, 23, 24, 25, 26 as shown in FIG. 24. The continuous-fiber sheet 90 is housed inside the cavity 92, and a slight space is left on an upper surface side of the continuous-fiber sheet 90.

Figure 26:
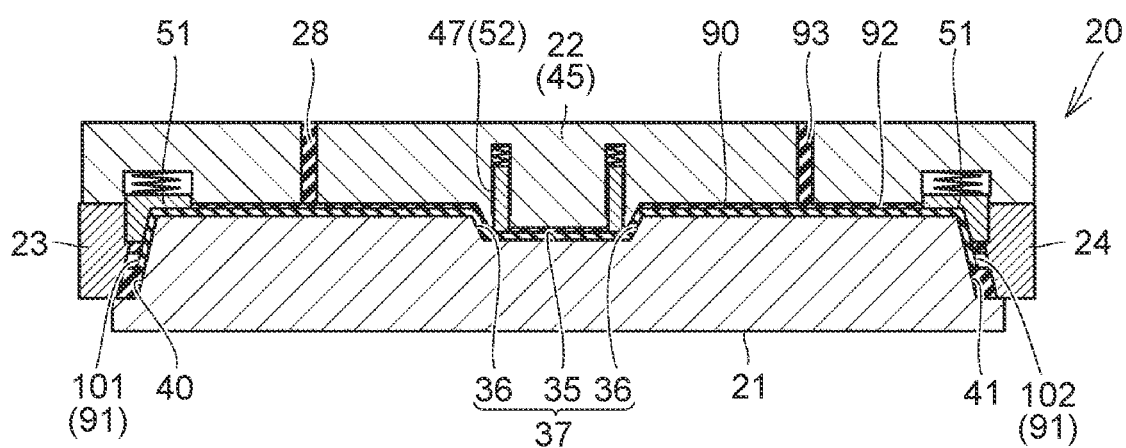
FIG. 26 is a sectional view showing the molding device 20 and the continuous-fiber sheet 90 in a resin injection step S7.

FIG. 26 is a sectional view showing the molding device 20 and the continuous-fiber sheet 90 in the resin injection step S7.

In the resin injection step S7, resin 93 is supplied through the resin supply path 28 into the cavity 92. At the time when the resin 93 flows into the cavity 92, the outer peripheral edges of the side portions 101, 102, 103, 104 of the continuous-fiber sheet 90 are pressed by the molds 23, 24, 25, 26 against the peripheral surface 33 of the mold 22.

Therefore, the side portions 101, 102, 103, 104 can be restrained from rolling up over the peripheral surface 33 of the mold 21 due to the resin 93 as the resin 93 enters the cavity 92.

The continuous-fiber sheet 90 is formed by weaving fibers, and the resin 93 penetrates into the continuous-fiber sheet 90 when the resin 93 is supplied into the cavity 92.

Thereafter, the resin 93 inside the cavity 92 is cooled to form the case main body 2 that is a molded article inside the cavity 92.

Then, the molds 22, 23, 24, 25, 26 are moved in the directions away from the mold 21 to allow the case main body 2 to be taken out. As has been described above, the molding device 20 according to Embodiment 1 can manufacture a molded article containing the continuous-fiber sheet 90 in which a recessed or raised portion is formed.

Moreover, applying an excessive pulling force to the continuous-fiber sheet 90 in the process of bringing the continuous-fiber sheet 90 into close contact with the surface of the mold 21 is avoided, so that fracture of the continuous-fiber sheet 90 is avoided.

In Embodiment 1, the mold 21 is placed below the mold 22, and the continuous-fiber sheet 90 is placed on the mold 21 in the disposition step S1, but the molding device 20 is not limited to the above-described configuration.

Figure 27:
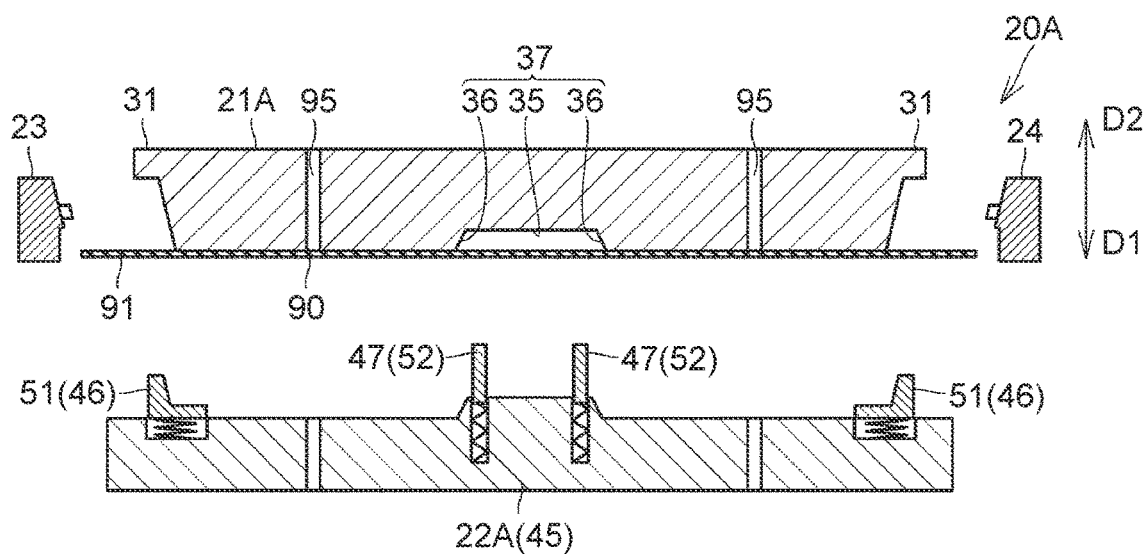
FIG. 27 is a sectional view showing a molding device 20A that is a modified example of the molding device.

FIG. 27 is a sectional view showing a molding device 20A that is a modified example of the molding device. The molding device 20A includes a mold 21A and a mold 22A. The mold 21A is placed above the mold 22A, and a plurality of air suction openings 95 for sucking up the continuous-fiber sheet 90 is formed in the mold 21A. In the disposition step S1, the continuous-fiber sheet 90 is sucked up onto a lower surface of the mold 21A.

In Embodiment 1, the mold 22 is configured to move relative to the mold 21 in the approaching direction D1 and the separating direction D2, but the mold 21 may be configured to move toward the mold 22. Moreover, both the mold 21 and the mold 22 may be configured to be movable in the approaching direction D1 and the separating direction D2.

The mold 21 and the mold 22 are configured such that the approaching direction D1 and the separating direction D2 are oriented in the downward direction and the upward direction, respectively. Alternatively, the mold 21 and the mold 22 may be placed such that the approaching direction D1 and the separating direction D2 are oriented in horizontal directions.

In Embodiment 1, the bulges 110 are smoothed out as the side portions 101, 102, 103, 104 are pulled. Alternatively, for example, the side portions 101, 102 arranged on opposite sides in the width direction W may be pulled. This is because in Embodiment 1 the bulges 110 are formed along long sides of the recessed portion 37 and therefore pulling the side portions 101, 102 can smooth out the bulges 110.

Embodiment 2

Figure 28:
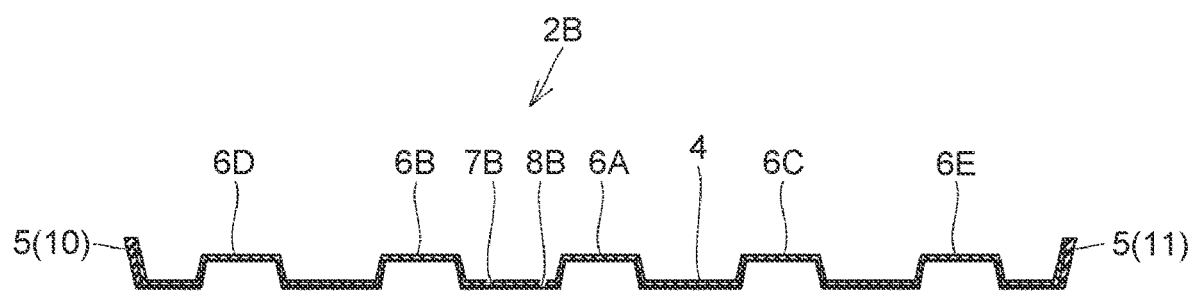
FIG. 28 is a sectional view showing a case main body 2B as a molded article molded by using the molding device 20B.

A molding device 20B according to Embodiment 2 will be described using FIG. 28 etc. FIG. 28 is a sectional view showing a case main body 2B as a molded article molded by using the molding device 20B.

Like the case main body 2, the case main body 2B includes the bottom plate 4 and the peripheral wall 5. A plurality of projections 6A, 6B, 6C, 6D, 6E is formed in the bottom plate 4. The case main body 2B includes a continuous-fiber part 7B and a resin part 8B. The continuous-fiber part 7B is placed on an inner peripheral surface of the resin part 8B, and a plurality of projections as raised portions is also formed in the continuous-fiber part 7B.

Figure 29:
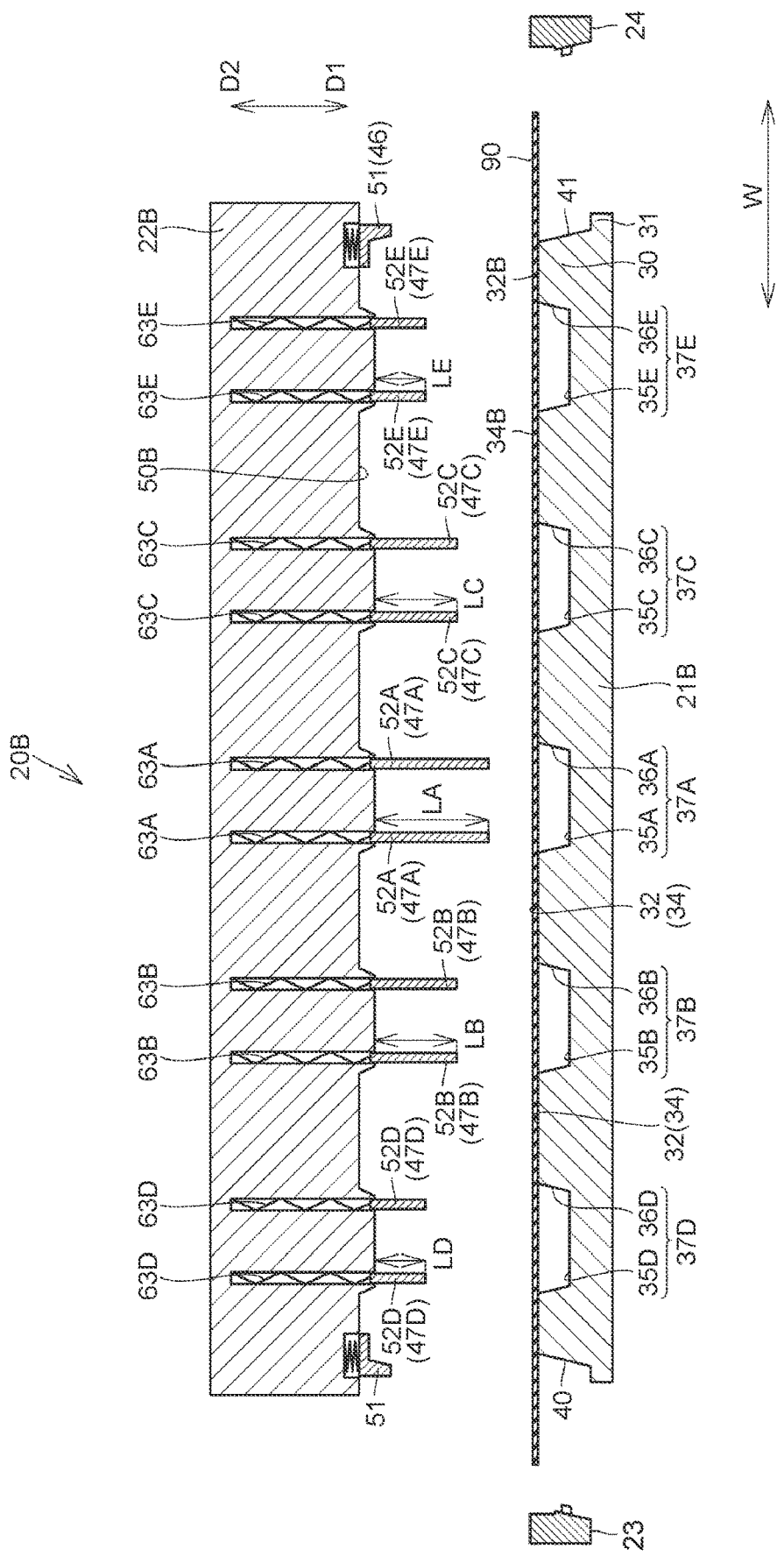
FIG. 29 is a sectional view showing the molding device 20B.

FIG. 29 is a sectional view showing the molding device 20B. The molding device 20B includes a mold 21B, a mold 22B, and the molds 23, 24, 25, 26. The molds 23, 24, 25, 26 of the molding device 20B have the same structure as the molds 23, 24, 25, 26 of the molding device 20 according to Embodiment 1. In FIG. 29, the molds 25, 26 are not shown.

Like the mold 21, the mold 21B includes the mold main body 30 and the flange 31. A plurality of recessed portions 37A, 37B, 37C, 37D, 37E is formed in a placing surface 32B of the mold main body 30. The recessed portions 37A, 37B, 37C, 37D, 37E respectively include recessed surfaces 35A, 35B, 35C, 35D, 35E having a rectangular shape and inner-side surfaces 36A, 36B, 36C, 36D, 36E.

The mold 22B includes a plurality of pressing members 47A, 47B, 47C, 47D, 47E and the pulling member 46. The pulling member 46 includes the contact members 51 placed along an outer peripheral edge portion of a lower surface 50B of the mold 22B.

The pressing member 47A is placed at the center of the mold 22B in the width direction W. The pressing member 47B is provided closer to the long-side surface 40 than the pressing member 47A is, and the pressing member 47D is provided closer to the long-side surface 40 than the pressing member 47B is. Similarly, the pressing member 47C is provided closer to the long-side surface 41 than the pressing member 47A is, and the pressing member 47E is provided closer to the long-side surface 41 than the pressing member 47C is.

The pressing member 47A includes a plurality of support pins 52A, and the pressing members 47B, 47C, 47D, 47E also include pluralities of support pins 52B, 52C, 52D, 52E, respectively.

Each support pin 52A is located above the vicinity of a corner of the recessed surface 35A. Similarly, the support pins 52B, 52C, 52D, 52E are placed above the vicinity of corners of the recessed surfaces 35B, 35C, 35D, 35E.

The support pins 52A, 52B, 52C, 52D, 52E are respectively urged downward by a urging force from urging members 63A, 63B, 63C, 63D, 63E provided inside the mold main body 45.

In the state shown in FIG. 29, the mold 22B is located above and away from the mold 21B, and lower ends of the support pins 52A, 52B, 52C, 52D, 52E are located away from the continuous-fiber sheet 90 and the mold 21B.

Accordingly, the support pins 52A, 52B, 52C, 52D, 52E are protruded downward from the lower surface 50B by the urging force from the urging members 63A, 63B, 63C, 63D, 63E, respectively. In this case, protruding lengths of the support pins 52A, 52B, 52C, 52D, 52E are protruding lengths LA, LB, LC, LD, LE, respectively. The protruding length LA is longer than the protruding lengths LB, LC, and the protruding lengths LB, LC are longer than the protruding lengths LD, LE.

Thus, the positions of the lower ends of the support pins 52A, 52B, 52C, 52D, 52E become higher from a center side toward the long-side surfaces 40, 41 in the width direction W.

A process of molding the case main body 2B that is a molded article by using the molding device 20B having the above-described configuration will be described. Like the manufacturing method according to Embodiment 1 shown in FIG. 10, the manufacturing method of the case main body 2B according to Embodiment 2 also includes the preparation step S0 to the resin injection step S7. In the preparation step S0 of the manufacturing method according to Embodiment 2, the molding device 20B including the mold 21B and the mold 22B is prepared as shown in FIG. 29. Specifically, in the molding device 20B, the mold 22B is set in a state of being separated from the mold 21B in the separating direction D2.

In the placing step S1, the continuous-fiber sheet 90 is placed on the placing surface 32B of the mold 21B as shown in FIG. 29.

In the placing step S1, the continuous-fiber sheet 90 has a plate shape, and the continuous-fiber sheet 90 is placed on a main surface 34B without entering the recessed portions 37A, 37B, 37C, 37D, 37E.

Figure 30:
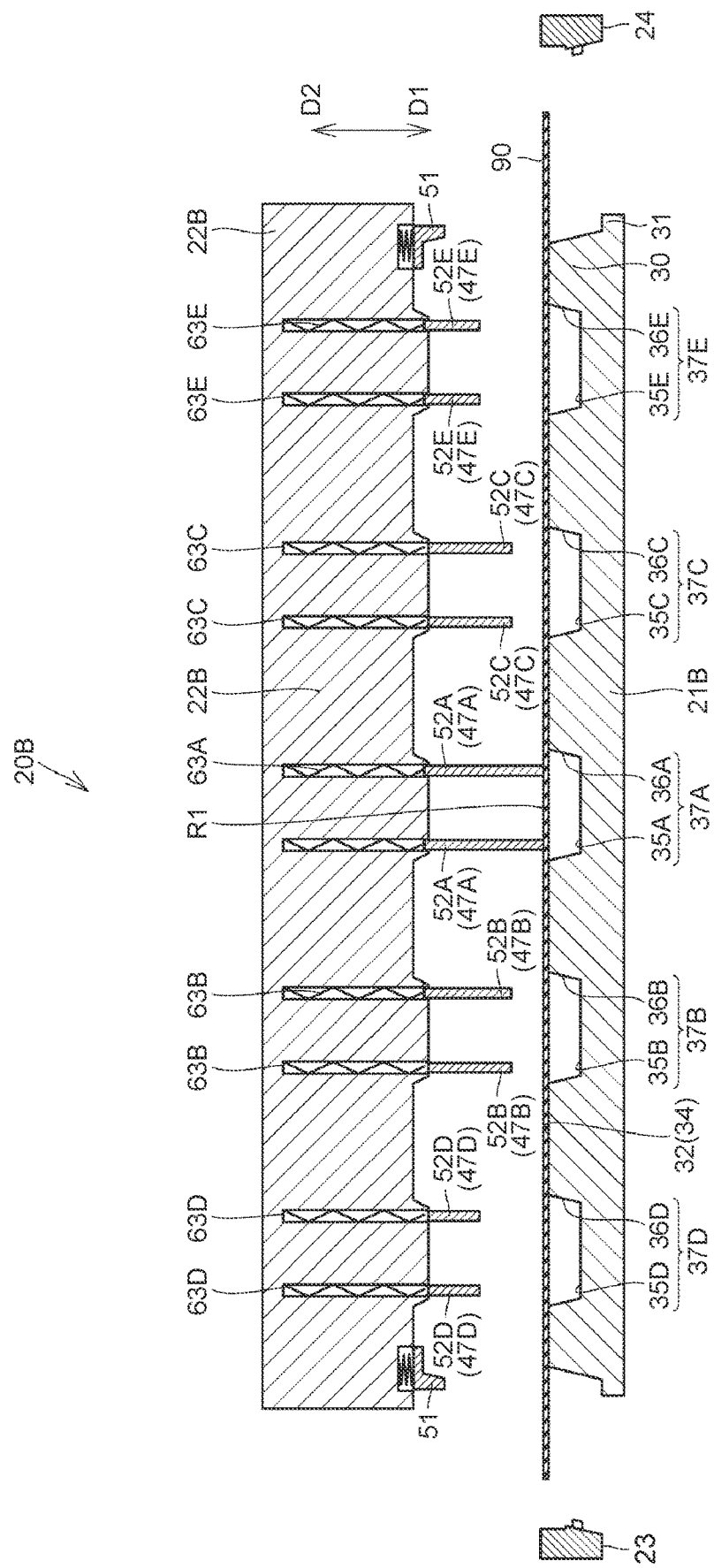
FIG. 30 is a sectional view showing the molding device 20B and the continuous-fiber sheet 90 in the moving-downward step S2.

FIG. 30 is a sectional view showing the molding device 20B and the continuous-fiber sheet 90 in the moving-downward step S2. In the moving-downward step S2, the mold 22B is moved in the approaching direction D1 and thus the mold 22B is moved so as to come closer to the mold 21B.

Then, of the support pins 52A, 52B, 52C, 52D, 52E, the support pin 52A first comes into contact with the continuous-fiber sheet 90.

Figure 31:
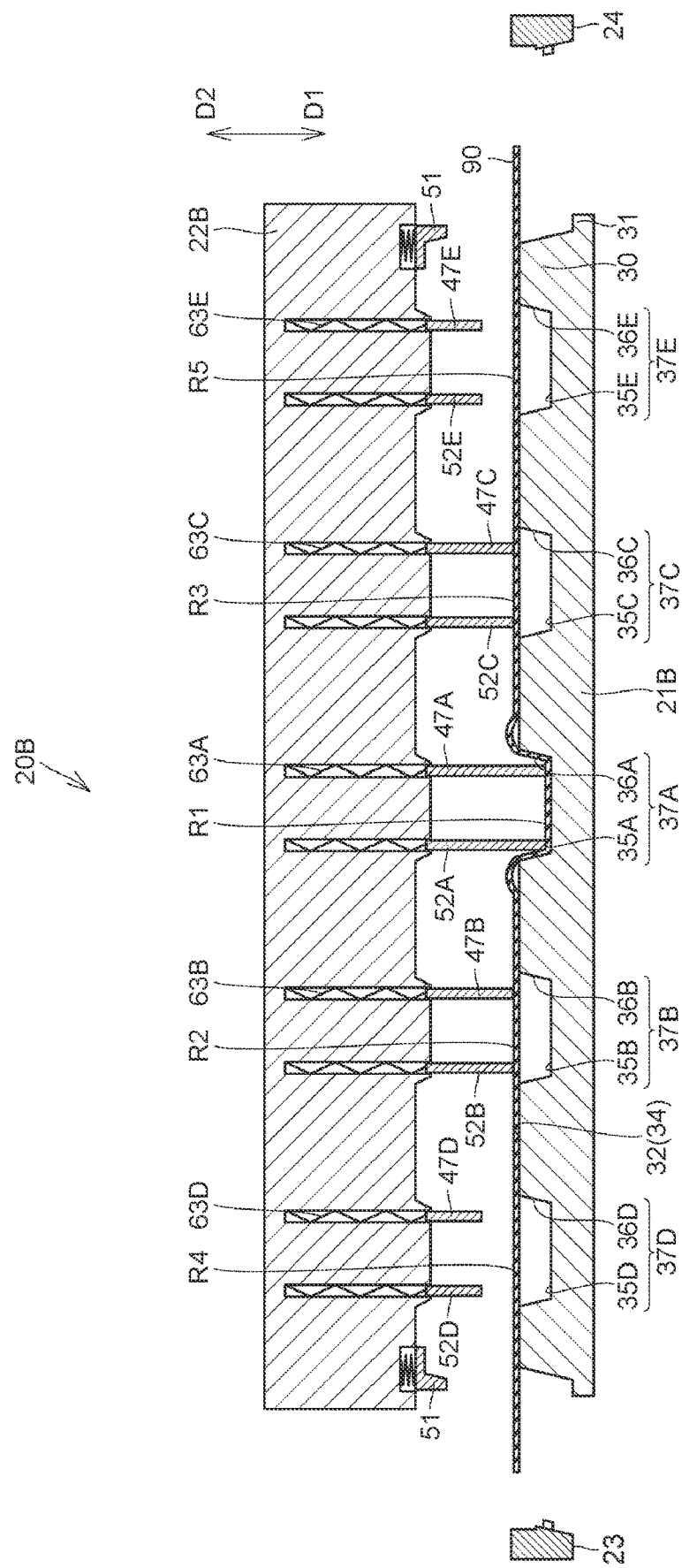
FIG. 31 is a sectional view in an initial step of the pin pressing step S3.

FIG. 31 is a sectional view in an initial step of the pin pressing step S3. In an initial state in the placing step 51, first, the pressing member 47A presses the portion-to-be-pressed R1 that is a portion of the continuous-fiber sheet 90, and thereby moves the portion-to-be-pressed R1 toward the recessed surface 35A.

Then, the portion-to-be-pressed R1 comes into contact with the recessed surface 35A, and the portion-to-be-pressed R1 is pressed against the recessed surface 35A. Here, the continuous-fiber sheet 90 may be deformed so as to partially bulge as a result of the pressing member 47A pressing the portion-to-be-pressed R1 against the recessed surface 35A. Specifically, the continuous-fiber sheet 90 may be deformed so as to bulge around the opening of the recessed portion 37A. On the other hand, the pressing members 47B, 47C come into contact with the continuous-fiber sheet 90.

Figure 32:
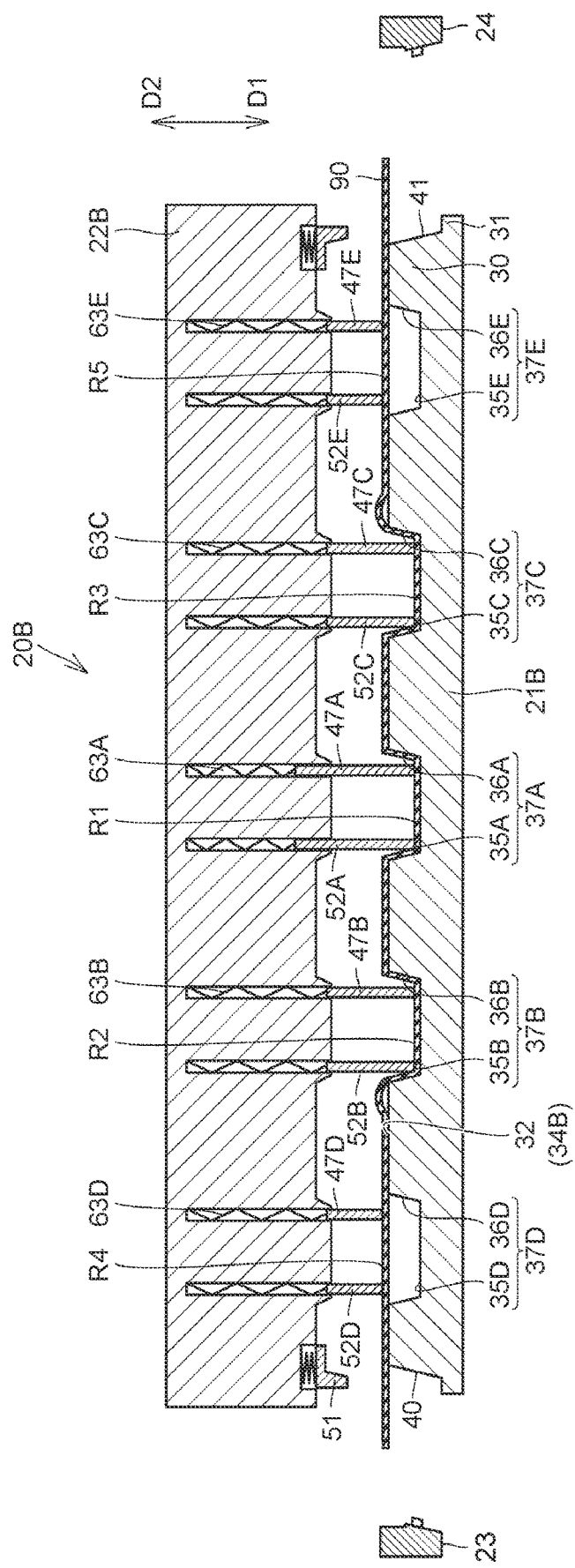
FIG. 32 is a sectional view showing a step following the step shown in FIG. 31.

FIG. 32 is a sectional view showing a step following the step shown in FIG. 31. In the state shown in FIG. 32, the pressing members 47B, 47C press portions of the continuous-fiber sheet 90 located on the outer side of the portion-to-be-pressed R1 in the approaching direction D1 and thus move these portions in the approaching direction D1. Specifically, the pressing member 47B moves a portion-to-be-pressed R2 in the approaching direction D1, and the pressing member 47C moves a portion-to-be-pressed R3 in the approaching direction D1.

As a result, the bulges formed in the vicinity of the opening of the recessed portion 37A are smoothed out, so that a portion of the continuous-fiber sheet 90 located between the portion-to-be-pressed R1 and the portion-to-be-pressed R2 comes into close contact with the main surface 34B of the mold 21 and the inner surface of the recessed portion 37A. Similarly, a portion of the continuous-fiber sheet 90 located between the portion-to-be-pressed R1 and the portion-to-be-pressed R3 comes into close contact with the inner surface of the recessed portion 37A and the main surface 34B. Thus, in Embodiment 2, the pressing members 47B, 47C function also as pulling members that pull portions of the continuous-fiber sheet 90 located on the outer peripheral side of the portion-to-be-pressed R1.

Then, the pressing members 47B, 47C press the portions-to-be-pressed R2, R3 against the recessed surfaces 35B, 35C. As a result, bulges may be formed at a portion of the continuous-fiber sheet 90 located closer to the long-side surface 40 than the portion-to-be-pressed R2 is, and at a portion thereof located closer to the long-side surface 41 than the portion-to-be-pressed R3 is.

On the other hand, at the time when the pressing members 47B, 47C press the portion-to-be-pressed R2, R3 against the recessed surfaces 35B, 35C, the pressing members 47D, 47E come into contact with the continuous-fiber sheet 90.

Figure 33:
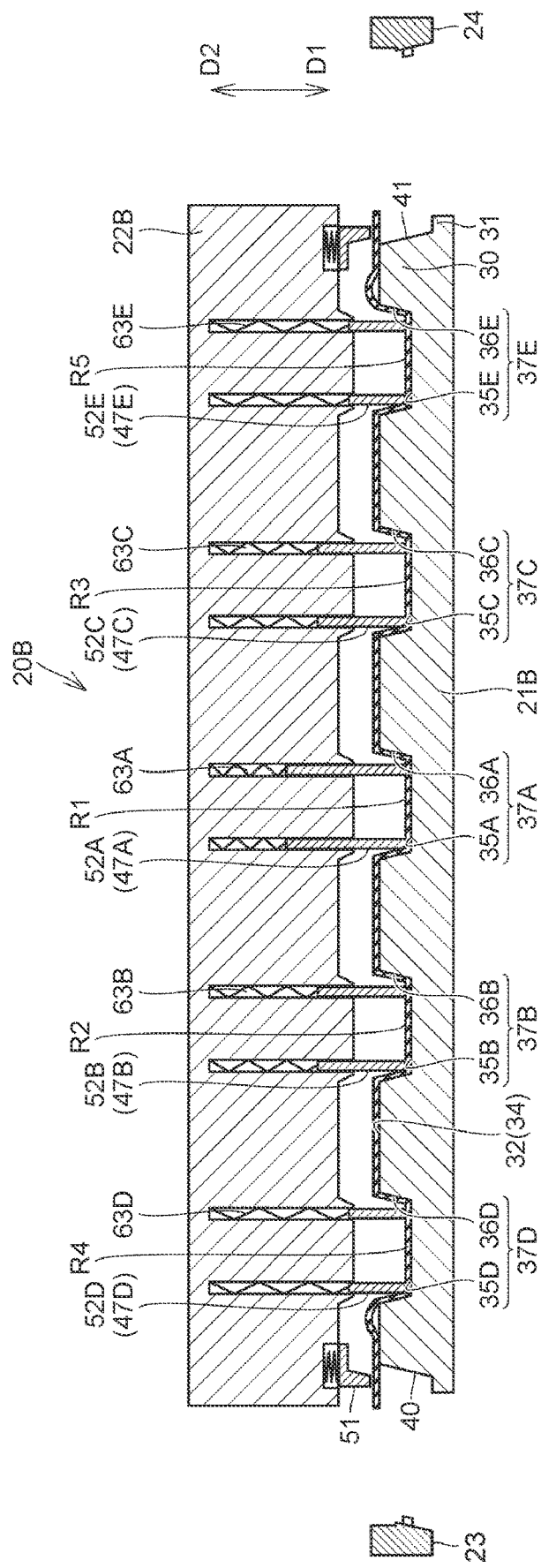
FIG. 33 is a sectional view showing a step following the step shown in FIG. 32.

FIG. 33 is a sectional view showing a step following the step shown in FIG. 32. The pressing members 47D, 47E press portions-to-be-pressed R4, R5 of the continuous-fiber sheet 90 in the approaching direction D1. Specifically, the portions-to-be-pressed R4, R5 of the continuous-fiber sheet 90 are moved downward by the pressing members 47D, 47E.

As a result, the bulge at the portion of the continuous-fiber sheet 90 located closer to the long-side surface 40 than the portion-to-be-pressed R2 is, is smoothed out, so that the continuous-fiber sheet 90 comes into close contact with the main surface 34B and the inner surface of the recessed portion 37B. Similarly, the bulge at the portion of the continuous-fiber sheet 90 located closer to the long-side surface 41 than the portion-to-be-pressed R3 is, is smoothed out, so that the continuous-fiber sheet 90 comes into close contact with the main surface 34B and the inner surface of the recessed portion 37C. Thus, the pressing members 47D, 47E bring the continuous-fiber sheet 90 into close contact with the main surface 34B etc. by pulling the portions of the continuous-fiber sheet 90 located on the outer peripheral side of the portions-to-be-pressed R1, R2, R3, and therefore the pressing members 47D, 47E function also as pulling members.

Then, the pressing members 47D, 47E press the portions-to-be-pressed R4, R5 against the recessed surfaces 35D, 35E. As a result, a bulge may be formed at a portion of the continuous-fiber sheet 90 located closer to the long-side surface 40 than the portion-to-be-pressed R4 is. Similarly, a bulge may be formed at a portion of the continuous-fiber sheet 90 located closer to the long-side surface 41 than the portion-to-be-pressed R5 is.

Figure 34:
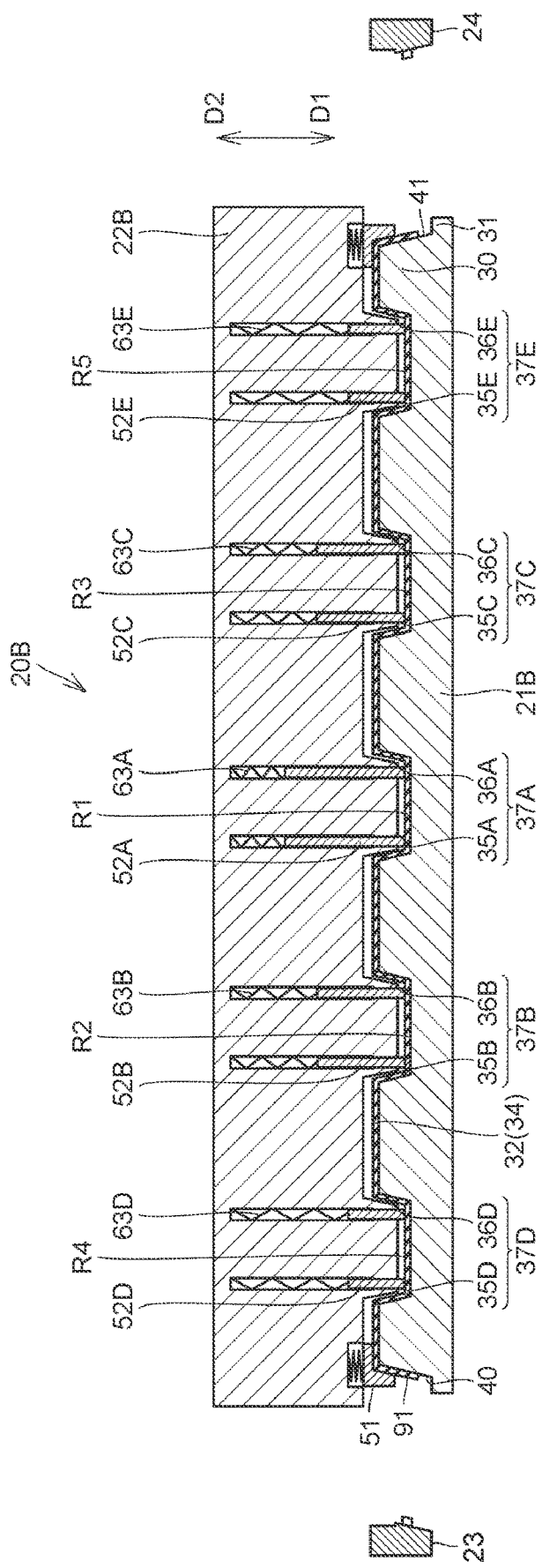
FIG. 34 is a sectional view showing the molding device 20B and the continuous-fiber sheet 90 in the pulling step S4.

FIG. 34 is a sectional view showing the molding device 20B and the continuous-fiber sheet 90 in the pulling step S4.

As shown in FIG. 34, the contact members 51 press the outer peripheral portion 91 of the continuous-fiber sheet 90 in the approaching direction D1.

Thus, the outer peripheral portion 91 of the continuous-fiber sheet 90 is pulled in the approaching direction D1, so that the portion of the continuous-fiber sheet 90 located closer to the long-side surface 40 than the portion-to-be-pressed R4 is comes into close contact with the inner surface of the recessed portion 37D and the main surface 34B. Similarly, the portion of the continuous-fiber sheet 90 located closer to the long-side surface 41 than the portion-to-be-pressed R5 is comes into close contact with the placing surface 32B and the inner surface of the recessed portion 37E.

Also in Embodiment 2, the contact members 51 are provided in a ring-like shape along the outer peripheral edge portion of the lower surface 50B of the mold 22B, so that the entire periphery of the main body 100 of the continuous-fiber sheet 90 is pulled. Thus, the main body 100 comes into close contact with the main surface 34B.

The pulling step S4 according to Embodiment 2 is thus completed, and thereafter, in the moving-closer step S5, the mold 22B is moved further downward from the state shown in FIG. 34.

Figure 35:
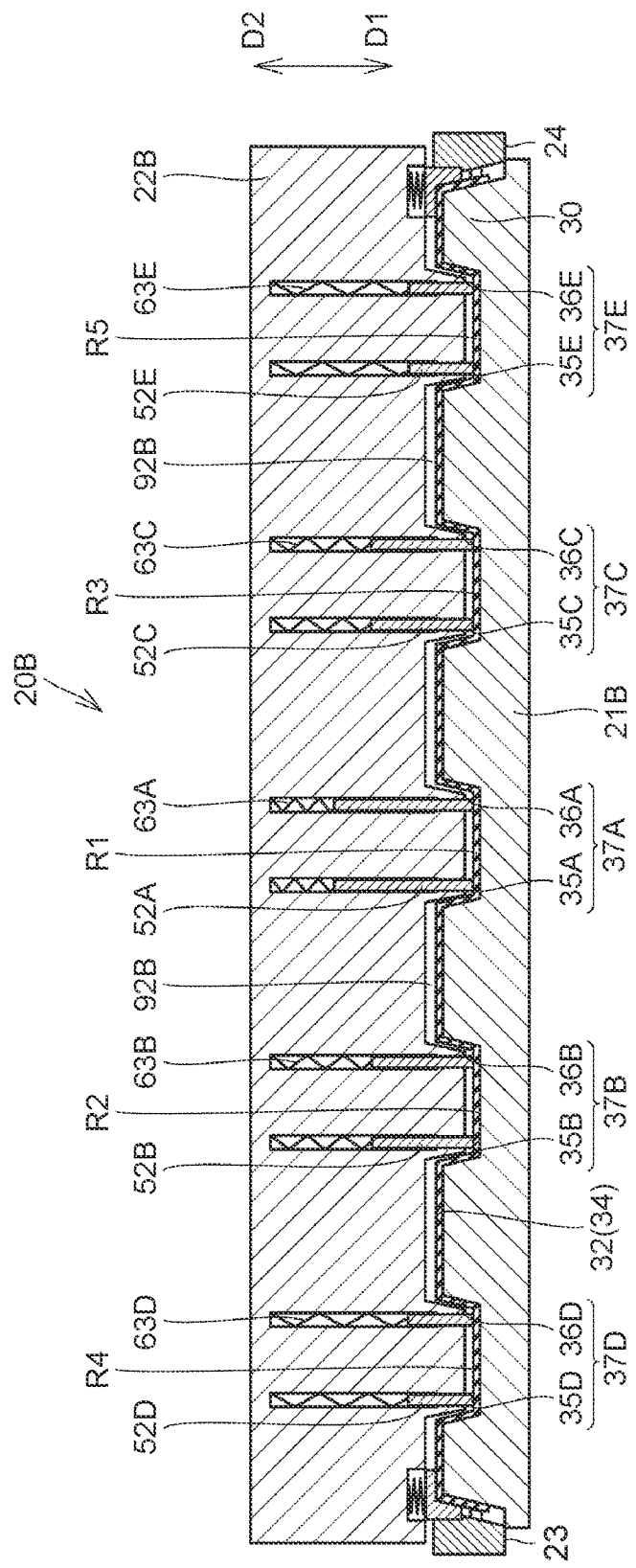
FIG. 35 is a sectional view showing the edge fixing step S6.

FIG. 35 is a sectional view showing the edge fixing step S6. As shown in FIG. 35, the molds 23, 24 press the outer peripheral edges of the outer peripheral portion 91 against the long-side surfaces 40, 41.

Moreover, like the molds 23, 24, the molds 25, 26 (not shown) also press the outer peripheral edges of the outer peripheral portion 91 against the peripheral surface 33.

Thus, in the state where the mold 22B and the mold 21B are located close to each other and the molds 23, 24, 25, 26 are located close to the mold 21B, the mold 22B is moved further downward, so that the lower surface 50B of the mold 22B and the upper surfaces of the molds 23, 24, 25, 26 come into contact with each other and a cavity 92B is formed. In the resin injection step S7, resin is supplied into the cavity 92B to form the case main body 2B.

As has been described above, the molding device 20B according to Embodiment 2 can mold the case main body 2B in which a plurality of recessed or raised portions is formed.

The embodiments disclosed herein should be construed as being in every respect merely illustrative and not restrictive. The scope of the present disclosure is defined by the claims, and is intended to include any changes equivalent in meaning and scope to the claims. In addition, numerical values etc. mentioned above are merely illustrative and the present disclosure is not limited to those numerical values and ranges.

What is claimed is:

1. A molding device comprising:
a first mold; and
a second mold, wherein:
the molding device is configured to shape a continuous-fiber sheet configured to be placed between the first mold and the second mold;
the first mold and the second mold face each other;
at least one of the first mold and the second mold is configured to be movable in a separating direction, in which the first mold and the second mold are separated relatively farther away from each other, and in an approaching direction, in which the first mold and the second mold are brought relatively closer to each other;
the first mold includes a placing surface on which the continuous-fiber sheet is configured to be placed between the first mold and the second mold;
the placing surface includes a main surface and at least one recessed surface that is connected to the main surface and that is located farther away from the second mold than the main surface;
the second mold includes at least one pressing member configured to press the continuous-fiber sheet which is configured to be placed on the placing surface against the recessed surface, and a pulling member configured to pull the continuous-fiber sheet;
the pressing member is configured to press a portion-to-be-pressed of the continuous-fiber sheet against the recessed surface in a state where the continuous-fiber sheet is placed between the first mold and the second mold; and
the pulling member includes a contact member having a base and a protrusion extending vertically downward from the base, and is configured to bring the continuous-fiber sheet into close contact with the main surface by pulling a portion of the continuous-fiber sheet located on an outer peripheral side of the portion-to-be-pressed after the pressing member presses the portion-to-be-pressed against the recessed surface,
wherein the continuous-fiber sheet which is configured to be placed on the placing surface includes an outer peripheral portion that projects outward from an outer peripheral edge portion of the placing surface, and the pulling member is configured to bring the continuous-fiber sheet into close contact with the main surface by pulling the outer peripheral portion.

2. The molding device according to claim 1, further comprising a third mold, wherein:
the first mold includes a peripheral surface that is connected to the outer peripheral edge portion of the placing surface and extends in a direction away from the second mold;
the pulling member is configured to bring the continuous-fiber sheet into close contact with the main surface by moving the outer peripheral portion in the approaching direction and shaping the outer peripheral portion so as to fit the peripheral surface; and
the third mold is configured to press against the peripheral surface, an outer edge of the outer peripheral portion, that has been shaped by the pulling member, so as to fit the peripheral surface.

3. The molding device according to claim 2, further comprising a supply device, wherein:
the molding device is configured such that a cavity to house the continuous-fiber sheet is formed, as the first mold, the second mold, and the third mold are moved closer to one another; and
the supply device is configured to supply resin into the cavity.

4. The molding device according to claim 1, wherein:
the placing surface includes a first recessed surface and a second recessed surface that is located closer to an outer peripheral edge portion of the placing surface than the first recessed surface;
the second mold includes a first pressing member and a second pressing member;
the portion-to-be-pressed of the continuous-fiber sheet includes a first portion-to-be-pressed and a second portion-to-be-pressed;
the first pressing member is configured to press the first portion-to-be-pressed of the continuous-fiber sheet against the first recessed surface;
the second pressing member is configured to press the second portion-to-be-pressed of the continuous-fiber sheet against the second recessed surface;
the second pressing member is configured to press the second portion-to-be-pressed against the second recessed surface after the first pressing member presses the first portion-to-be-pressed against the first recessed surface; and
the pulling member is configured to pull a portion of the continuous-fiber sheet located on an outer peripheral side of the second portion-to-be-pressed after the second pressing member presses the second portion-to-be-pressed against the second recessed surface.

5. A molded article manufacturing method comprising:
preparing a first mold and a second mold placed so as to face each other;
placing a continuous-fiber sheet between the first mold and the second mold; and
processing the continuous-fiber sheet by the first mold and the second mold, wherein:
at least one of the first mold and the second mold is configured to be movable in a separating direction, in which the first mold and the second mold are separated relatively farther away from each other, and in an approaching direction, in which the first mold and the second mold are brought relatively closer to each other;
the first mold includes a placing surface on which the continuous-fiber sheet is configured to be placed between the first mold and the second mold;
the placing surface includes a main surface and at least one recessed surface that is connected to the main surface and is located farther away from the second mold than the main surface; and
processing the continuous-fiber sheet includes pressing a portion-to-be-pressed of the continuous-fiber sheet against the recessed surface, and after pressing the portion-to-be-pressed against the recessed surface, bringing the continuous-fiber sheet into close contact with the main surface by pulling a portion of the continuous-fiber sheet located on an outer peripheral side of the portion-to-be-pressed, wherein the continuous-fiber sheet which is configured to be placed on the placing surface includes an outer peripheral portion that projects outward from an outer peripheral edge portion of the placing surface, and the bringing of the continuous-fiber sheet into close contact with the main surface included in the processing includes bringing the continuous-fiber sheet into close contact with the main surface by pulling the outer peripheral portion with a pulling member including a contact member having a base and a protrusion extending vertically downward from the base.

6. The molded article manufacturing method according to claim 5, further comprising pressing an outer edge of the outer peripheral portion that has been shaped so as to fit a peripheral surface of the first mold, against the peripheral surface by a third mold, wherein:

the peripheral surface of the first mold is connected to the outer peripheral edge portion of the placing surface and extends in a direction away from the second mold; and the bringing of the continuous-fiber sheet into close contact with the main surface included in the processing includes bringing the continuous-fiber sheet into close contact with the main surface by moving the outer peripheral portion in the approaching direction and shaping the outer peripheral portion so as to fit the peripheral surface.

7. The molded article manufacturing method according to claim 6, further comprising forming a cavity to house the continuous-fiber sheet by moving the first mold, the second mold, and the third mold closer to one another, and then supplying resin into the cavity.

8. The molded article manufacturing method according to claim 5, wherein:

the portion-to-be-pressed of the continuous-fiber sheet includes a first portion-to-be-pressed and a second portion-to-be-pressed;

the placing surface includes a first recessed surface and a second recessed surface that is located closer to an outer peripheral edge portion of the placing surface than the first recessed surface;

the pressing of the portion-to-be-pressed against the recessed surface included in the processing includes pressing a first portion-to-be-pressed of the continuous-fiber sheet against the first recessed surface, and pressing a second portion-to-be-pressed of the continuous-fiber sheet located on an outer peripheral side of the first portion-to-be-pressed against the second recessed surface; and bringing the continuous-fiber sheet into close contact with the main surface includes pulling the second portion-to-be-pressed after pressing the first portion-to-be-pressed against the first recessed surface.

* * * * *